Feb. 9, 1960
W. E. CONLEY ET AL
2,924,273
DEHYDRATING APPARATUS
Filed Feb. 13, 1956
6 Sheets-Sheet 1
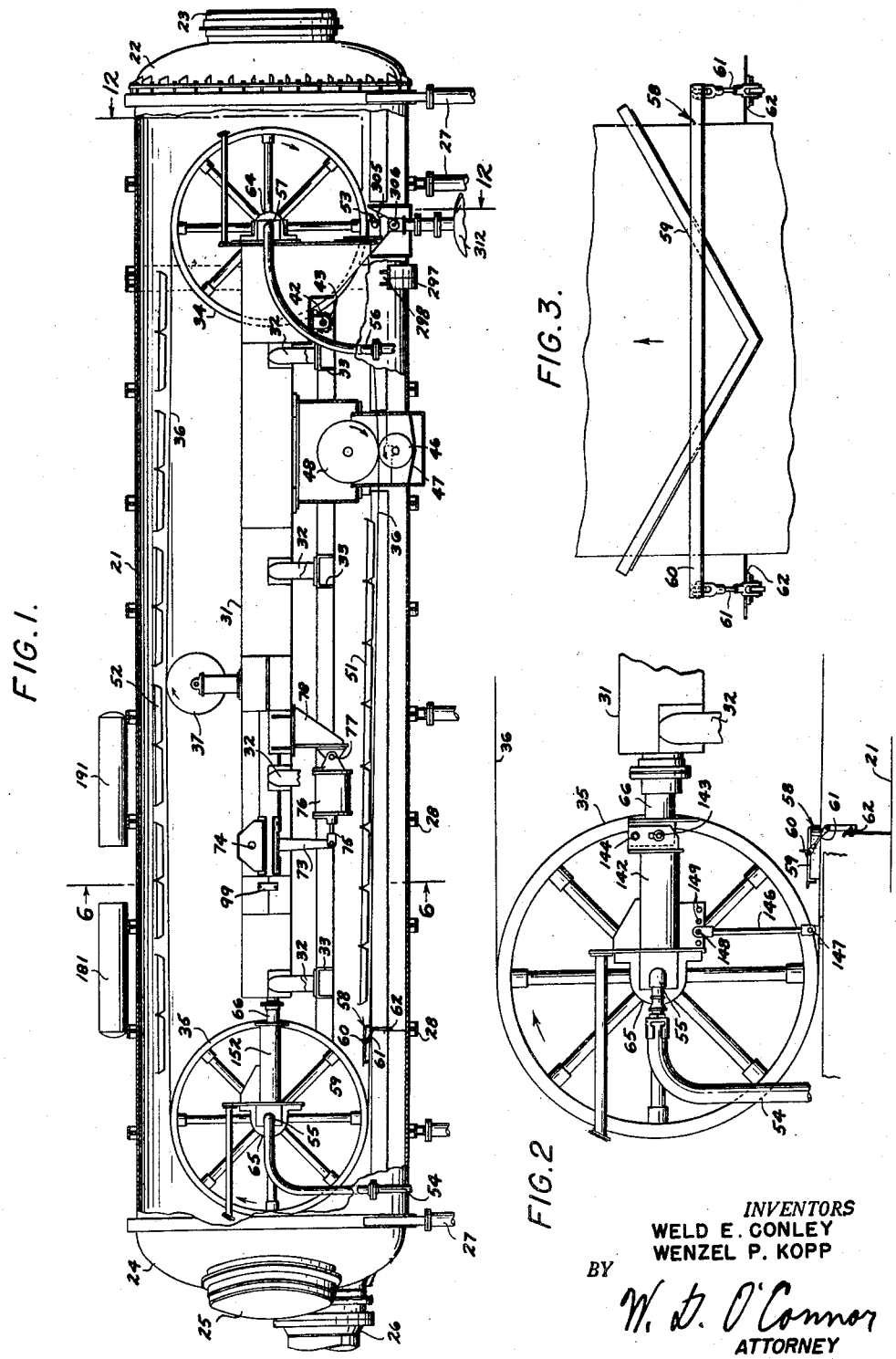
INVENTORS
WELD E. CONLEY
WENZEL P. KOPP
BY
*W. D. O'Connor*
ATTORNEY

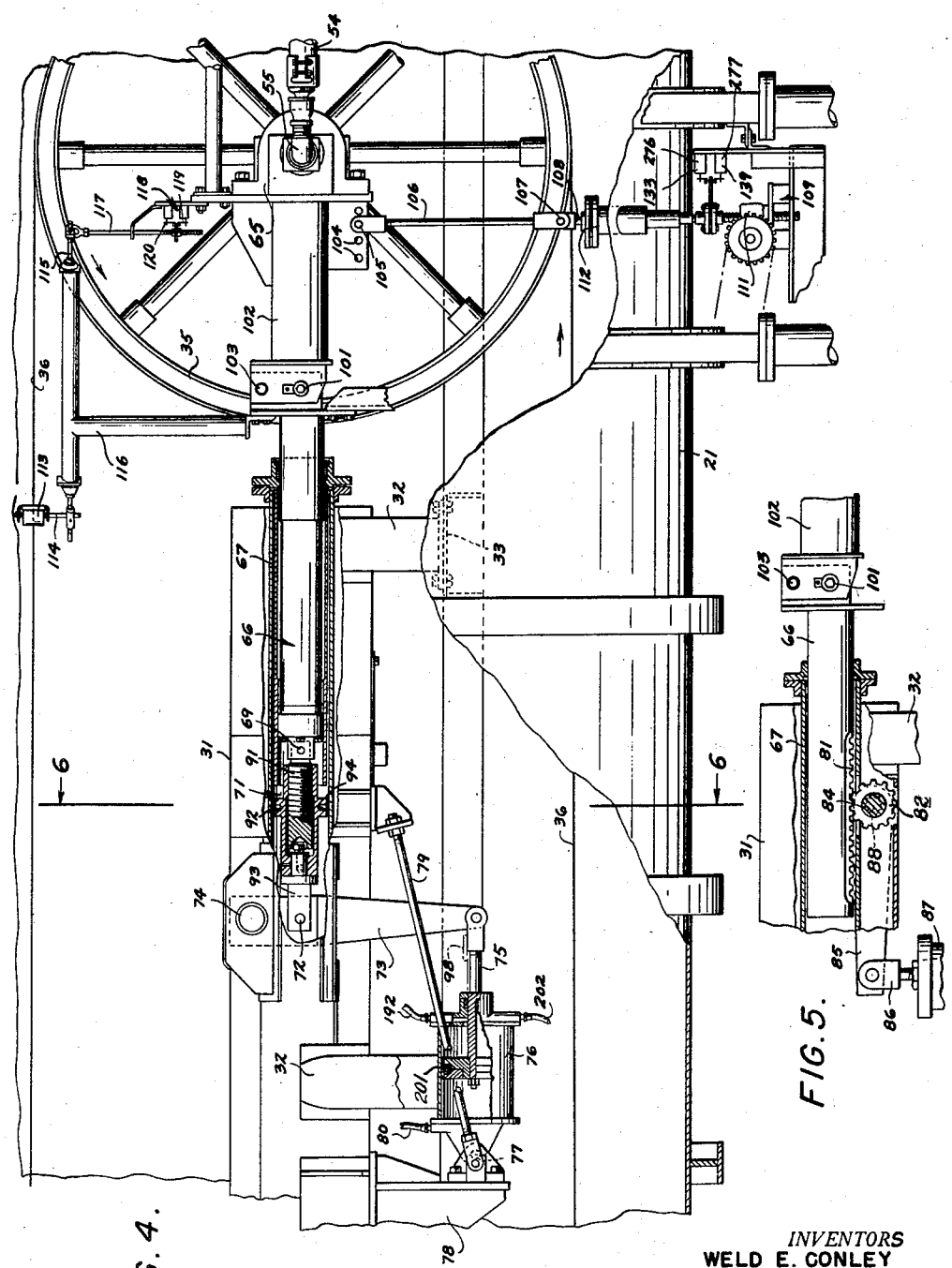

Feb. 9, 1960 W. E. CONLEY ET AL 2,924,273
DEHYDRATING APPARATUS
Filed Feb. 13, 1956 6 Sheets-Sheet 3
FIG. 6.
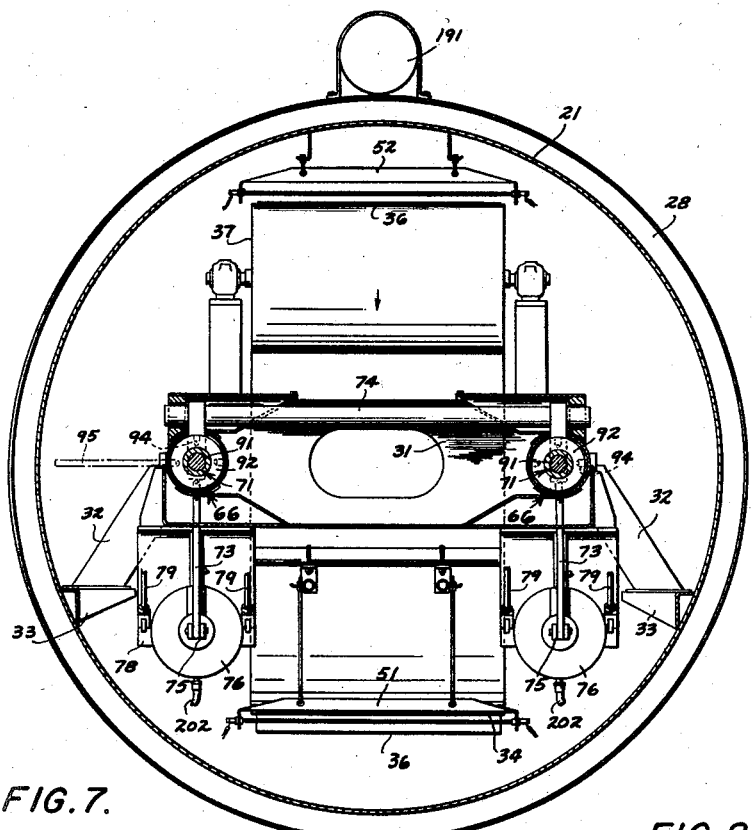
FIG. 7.
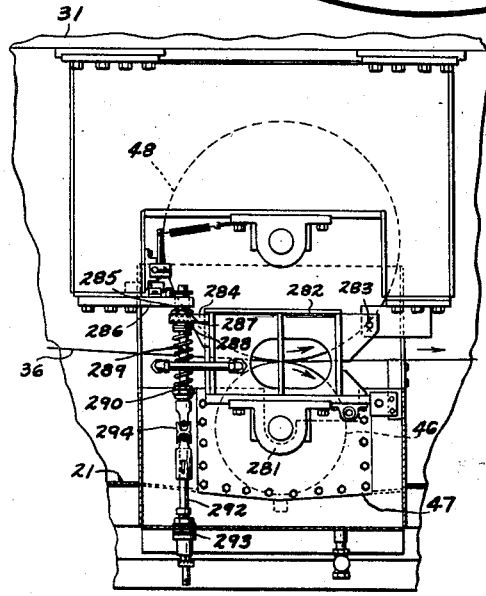
FIG. 8.
FIG. 9.
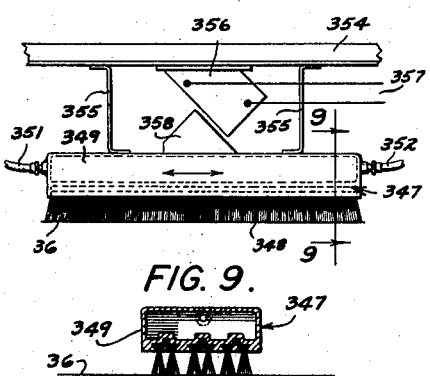
INVENTORS
WELD E. CONLEY
WENZEL P. KOPP
BY
N. D. O'Connor
ATTORNEY Feb. 9, 1960 W. E. CONLEY ET AL 2,924,273
DEHYDRATING APPARATUS
Filed Feb. 13, 1956 6 Sheets-Sheet 4

INVENTORS
WELD E. CONLEY
WENZEL P. KOPP
BY
W. D. O'Connor
ATTORNEY

INVENTORS
WELD E. CONLEY
WENZEL P. KOPP
BY
ATTORNEY

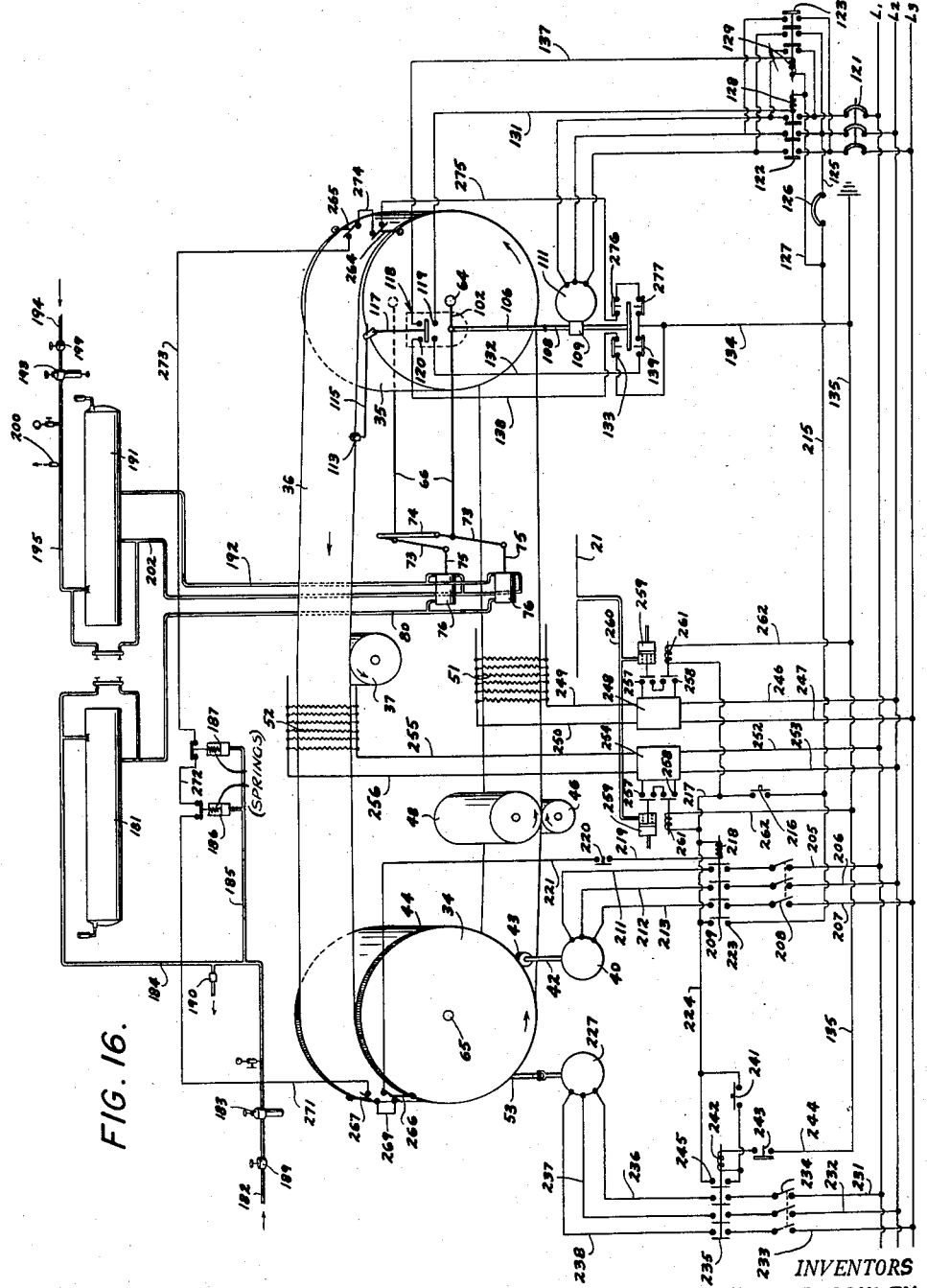

United States Patent Office 2,924,273
Patented Feb. 9, 1960

2,924,273

DEHYDRATING APPARATUS

Weld E. Conley, Wauwatosa, and Wenzel P. Kopp, Elm Grove, Wis., assignors to Chain Belt Company, Milwaukee, Wis., a corporation of Wisconsin Application February 13, 1956, Serial No. 564,996

23 Claims. (Cl. 159—12)

This invention relates, generally, to the art of dehydrating materials and more particularly to an improved continuous vacuum dehydrator of the drum and belt type.

In the dehydrating of sensitive materials it has been found that the operation can be accomplished with minimum deleterious effects upon the product if the drying action is performed as quickly as possible under closely controlled operating conditions. Dehydrating apparatus particularly adapted for this purpose takes the form of a continuously moving belt operating over heat exchanging drums in a manner to carry the material being dried successively through a series of material treating zones in which it is subjected to different temperature conditions according to a predetermined schedule of heating and cooling.

It is a general object of the present invention to provide improved dehydrating apparatus of the drum and belt type.

Another object of the invention is to provide improved apparatus for conveying material being dried in a dehydrator.

Another object is to provide an improved arrangement for maintaining a predetermined uniform tension in a conveyer belt.

Another object is to provide in a conveyer driving arrangement, an interlocking device operating to prevent driving of the conveyer belt unless the belt is properly tensioned.

Another object is to provide an interlocking control system arranged to prevent full energization of the drying heaters in a dehydrator unless the conveyer belt is running and that operates to reduce the heating action for preventing overheating of material on the belt should the belt stop during a dehydrating operation.

Another object is to provide interlocking control apparatus arranged to stop the operation of the conveyer belt if tensioning or tracking of the belt is not performed properly.

Another object is to provide in a vacuum dehydrator an interlocking control system arranged to reduce the heating effect whenever the vacuum is not adequate.

Another object is to provide a cooling arrangement for cooling the end of a dehydrator vacuum chamber that encloses the cooling drum.

A further object is to provide an improved arrangement for cooling an actuating cylinder operating in a heated atmosphere.

According to this invention, a vacuum dehydrator incorporated in a relatively long generally cylindrical housing constituting a vacuum chamber is provided with a material conveyer of the drum and belt type together with associated material treating apparatus and interconnecting control mechanism. The long cylindrical housing encloses spaced heat exchanging drums that carry an endless material supporting belt, one of the drums being movable bodily relative to the other to provide for tensioning and tracking the belt. A main supporting frame extending between the drums is provided with improved tensioning apparatus arranged to maintain a predetermined uniform tension throughout the belt regardless of changes in temperature or other conditions. The desired uniform belt tension is established by linkage mechanism actuated by fluid under predetermined pressure. This pressure fluid also actuates pressure responsive controls interconnected with the belt drive mechanism control system and operating in a manner to stop the belt if the tensioning pressure becomes either too high or too low. The belt driving mechanism is also under the control of limit switches arranged at the ends of each drum and operative to stop the belt should it run off either edge of either drum. Mechanism for automatically tilting the movable drum in tracking the belt is likewise provided with limit switches which operate to stop the belt in the event of over-travel of the tracker mechanism. Auxiliary heaters arranged to heat the material on the belt are interconnected with the control system in such a manner that their heating effect is reduced whenever the belt stops, as may happen by operation of one of the pressure switches or limit switches. This serves to avoid overheating material on the belt when the belt is not moving. The heater control system is also connected with pressure responsive switches which serve to reduce the heating effect when the vacuum in the chamber is not sufficient. Actuating cylinders for the belt tensioning apparatus contain water on the low pressure side that flows from an elevated expansion tank for cooling the cylinders to avoid overheating the cylinder packings. An improved doctor blade holder is arranged for receiving circulated coolant fluid that serves to cool the doctor blade which scrapes the dried material from the belt. The end portion of the housing containing the cooling drum and the doctor blade is isolated thermally from the heated part of the housing by a circumferentially arranged cooling jacket through which coolant fluid is circulated. An improved product discharging system is provided including a reversible conveyer that conveys the dried product alternately to either of two discharge ports.

The foregoing and other objects of this invention will become more fully apparent as the following detailed description of an improved vacuum dehydrator constituting exemplary embodying apparatus of the drum and belt type is read in conjunction with the accompanying illustrative drawings, wherein:

Figure 1 is a view in side elevation of a vacuum dehydrator of the belt and drum type embodying the invention, most of the housing having been broken away to reveal the internal mechanism;

Fig. 2 is an enlarged fragmentary view in side elevation of the heating drum shown in the left end of the housing in Fig. 1 and illustrating a modified drum supporting arrangement;

Fig. 3 is an enlarged plan view of a belt cleaning apparatus shown engaging the lower run of the belt in Figs. 1 and 2;

Fig. 4 is an enlarged fragmentary view in side elevation of internal parts of the dehydrator taken from the side opposite that shown in Figs. 1 and 2, most of the housing and some parts of the frame having been broken away to reveal the belt tensioning mechanism;

Fig. 5 is a fragmentary view in elevation generally similar to parts of Fig. 4 but showing a modified form of the belt tensioning mechanism;

Fig. 6 is a view in transverse section through the dehydrator taken on the plane represented by the lines 6—6 in Figs. 1 and 4 and showing the two interconnected tensioning mechanisms that operate respectively on the opposite ends of the movable drum;

Fig. 7 is an enlarged fragmentary view in side elevation showing in more detail the feeder mechanism that appears in Fig. 1, but taken from the other side of the machine;

Fig. 8 is a fragmentary view in elevation of a cooled brushing apparatus that illustrates a modified arrangement for removing dried product from the conveyer belt;

Fig. 9 is a view in cross section through the brushing apparatus, taken on the plane indicated by the line 9—9 in Fig. 8;

Fig. 16 is a schematic circuit diagram of the hydraulic and electrical control systems for the material conveying and treating apparatus in the dehydrator.

Figure 10:
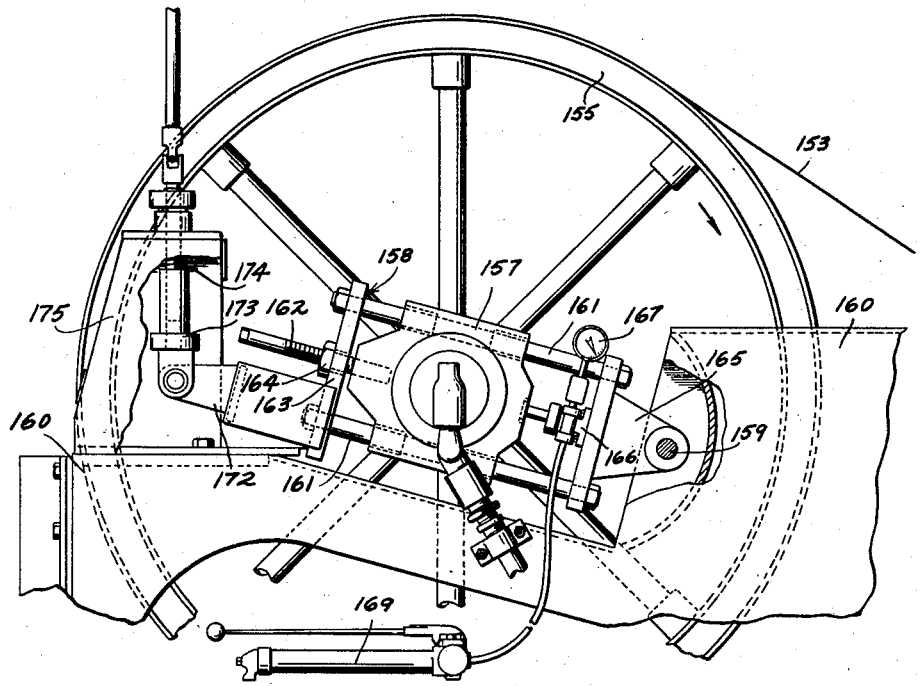
Fig. 10 is a fragmentary view in side elevation showing another drum supporting apparatus embodying a modified belt tensioning and tracking mechanism.

The particular vacuum dehydrator shown in the drawings by way of exemplifying the present invention is of the type employing a material carrying belt operating over a pair of spaced heat exchanging drums to form a conveyer, the mechanism being enclosed in a large generally cylindrical housing constituting a vacuum chamber. The improved apparatus is arranged to effect continuous drying of material under operating conditions that are closely controlled and readily adjustable to accommodate the drying process to the requirements of the particular material being dried. The equipment shown is especially designated to function continuously under predetermined operating conditions that are maintained automatically for the most part and requires only a minimum of attention from the operators.

Referring now more specifically to the drawings and particularly to the general view of the dehydrator shown in Fig. 1, the improved apparatus there illustrated comprises, in general, a large cylindrical housing 21, that is closed at each end to form an air tight vacuum chamber for containing the material treating mechanism. The right end of the housing, as shown in the drawing, is provided with a closure in the form of a separate dome or end-bell 22 that is removable to provide a large opening for introducing the operating mechanism into or removing it from the chamber. A covered opening or manhole 23 is provided in the dome 22 in order that entrance may be had into the housing for access to the operating mechanism within the chamber without removing the entire end-bell. The other end of the housing 21 is closed by a dome 24 that is fixed to the housing and which is likewise provided with a covered access manhole 25. The fixed dome 24 is furthermore provided with a large vacuum connection or exhaust conduit 26 constituting a suction line that leads to a suitable evacuator or vacuum pump system, shown diagrammatically in Fig. 12, which may operate automatically in a well known manner to maintain a predetermined degree of vacuum or low pressure atmosphere within the housing 21.

The entire apparatus is preferably supported upon a plurality of legs or posts 27 that engage the lower side of the housing 21 and support it in elevated position to provide room for discharging the dried product from the bottom of the housing. As shown in the drawing, the legs 27 are aligned with and secured to one or another of a plurality of spaced circumferentially arranged reinforcing rings 28 that encircle the housing 21 and serve to strengthen it against the external atmospheric pressure encountered when the chamber is evacuated.

The improved double drum and belt type material conveyer contained within the vacuum chamber 21 is in the form of a unitary apparatus mounted on a long independent main frame 31 supported along each side by spaced outwardly inclined legs or struts 32 the lower ends of which bear upon brackets 33 fastened to the inside of the housing 21. As shown in Fig. 1 of the drawing, the frame 31 carries at its right end a large rotatably mounted cooling drum 34 and at its left end a heating drum 35 that in this instance is of similar size and is mounted for limited bodily movement relative to the frame 31. The spaced drums 34 and 35 carry an endless material conveying belt 36 preferably in the form of a continuous band of relatively thin flexible metal such as stainless steel that operates over the two drums. In the particular dehydrator illustrated in the drawing, the belt 36 is about four feet wide and the drums are each nearly eight feet in diameter. The drums 34 and 35 are spaced apart about thirty five feet within the housing 21 which is approximately fifty feet long overall and twelve feet in diameter.

Figure 12:
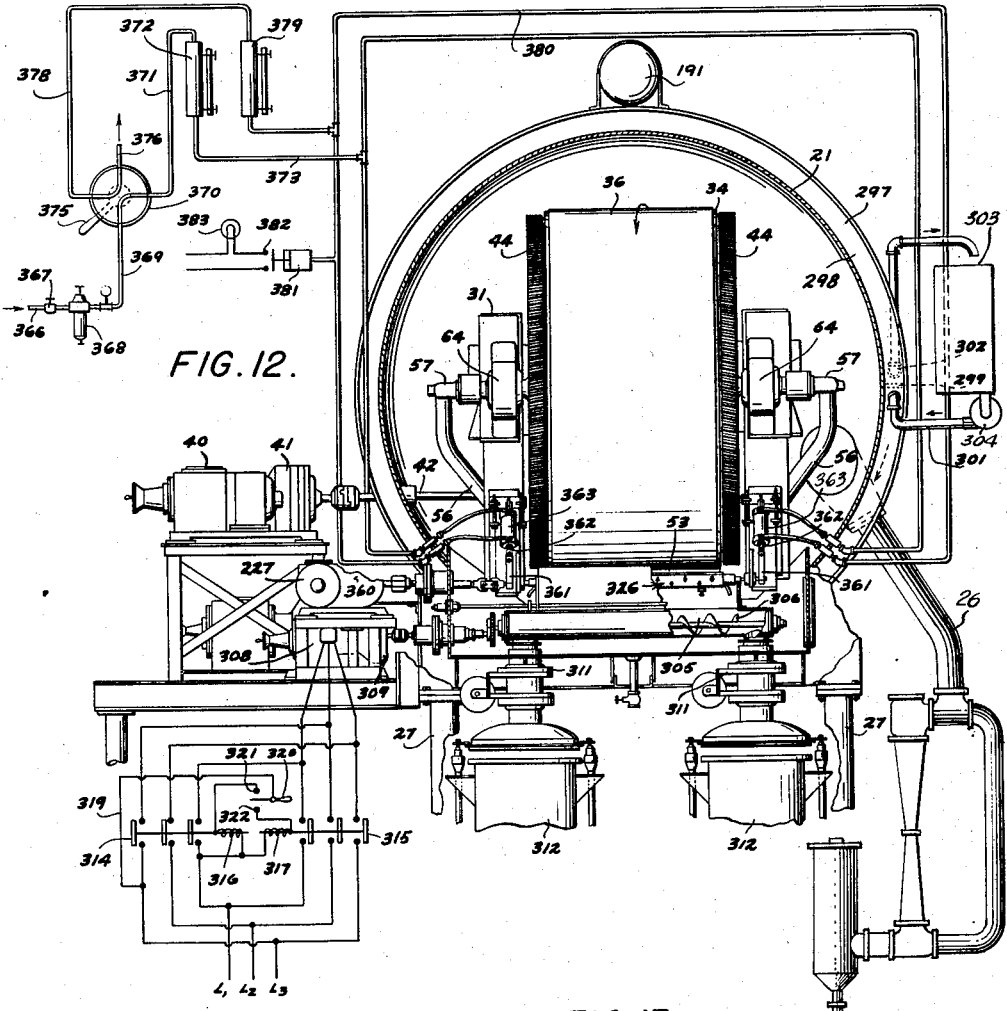
Fig. 12 is a partially diagrammatic view in transverse section through the dehydrator, taken on the plane represented by the line 12—12 in Fig. 1 and illustrating the improved product discharging apparatus and its associated control mechanism.

The upper run of the belt 36 may be additionally supported to prevent sagging by a supporting element in the form of an idler roller 37 that is rotatably mounted upon the frame 31 about midway between the drums 34 and 35 in position to engage the lower surface of the upper strand of the belt. In order that the belt 36 may operate as a conveyer in carrying the material being dried through a drying cycle in the dehydrator, it is power actuated by means of a driving motor 40 that is shown in Fig. 12 and represented diagrammatically in Fig. 16. The motor 40 operates through reduction gearing 41 to turn a shaft 42 that carries a pair of spaced pinions 43, shown in Fig. 1, which mesh with complementary ring gears 44 mounted respectively on the opposite ends of the cooling drum 34. Ordinarily the belt 36 operates at a speed in the neighborhood of forty to fifty feet per minute, but it may be run either slower or faster to meet different operating conditions.

The material to be dried in the dehydrator is applied in liquid form to the outer or lower surface of the lower run of the belt 36 by means of a feeding roller 46 as the belt recedes from the cooling drum 34. As shown in Fig. 1 of the drawing, the feeding roller 46 is rotatably mounted within a feed pan 47 from which it transfers the liquid material onto the belt in the form of a thin film. In order that the belt 36 may be maintained in position to receive a film of material of predetermined thickness, there is provided a back-up roller 48 that is rotatably carried by the frame 31. As more fully explained in copending application Serial No. 364,458 filed June 26, 1953, the back-up roller 48 is disposed to engage the inner or upper surface of the lower run of the belt 36 at a point opposite from the feeding roller 46 in a manner to hold the belt flat and in an exact position relative to the feeding roller.

In the drying operation, the film of liquid material on the belt 36 is first carried by the belt beneath a pre-heater 51 that is constituted by a plurality of electrically energized radiant heaters as more fully explained in copending application Serial No. 490,972 filed February 28, 1955, and which serves to precondition the film of material. The belt 36 then carries the film of material around the heating drum 35 which supplies heat for vaporizing most of the liquid constituent of the film into the low pressure atmosphere within the chamber 21. From the heating drum 35 the belt carries the nearly dry material beneath an afterheater 52 likewise constituted by a series of electrically operated radiant heaters which serve to complete the drying operation, as more fully explained in the copending application Serial No. 490,972. After the material has been dried in this manner, the belt carries it around the cooling drum 34 which operates to chill the dried material in preparing it for removal from the belt. The cooled dried material is then scraped from the belt by means of a doctor blade 53 that engages the belt as it is about to leave the cooling drum.

The heating drum 35 which supplies most of the heat of vaporization to the film of material is preferably heated by steam that flows into it through a pipe 54 from a suitable source such as a steam boiler (not shown), the pipe 54 being connected to one end of the drum on its axis by means of a rotary coupling 55. As shown in Fig. 4, a similar pipe and rotary coupling at the other end of the drum serves to withdraw condensate resulting from the heating action of the steam. The cooling drum 34 is cooled by means of coolant fluid that circulates into it through a corresponding pipe 56 and an associated rotary coupling 57, a similar pipe and coupling at the other end of the drum serving to complete the coolant fluid circuit through the drum. The detailed structure of the cooling drum 34 and heating drum 35 with their connected circulating systems may be generally similar to corresponding drums shown and described in the previously mentioned copending application Serial No. 364,458, filed June 26, 1953.

In order to avoid the possibility of the belt 36 being damaged by foreign objects accidentally carried upon the inner surface of its lower run and which might otherwise pass between it and the heating drum 35, there is provided a belt cleaning apparatus 58. As shown in Figs. 1, 2 and 3, the belt cleaning apparatus 58 rides upon and cleans the inner surface of the belt just before it runs onto the heating drum 35. As best shown in Fig. 3, the cleaning apparatus 58 is in the form of a scraping blade 59 that is arranged in V-shape and that extends across the belt with the point of the V at the center of the belt and directed toward the oncoming portion or run thereof. By this arrangement any foreign material riding on the belt is engaged by the V-shaped blade 59 which operates in the manner of a plough to deflect the material to the one or the other edge of the belt in such a manner that it falls free from the belt and is prevented from entering between the belt and the drum as the belt runs onto the heating drum.

As shown, the V-shaped blade 59 is secured to and carried by a cross frame member 60 that extends transversely to the belt and projects at each edge thereof. As appears in the drawing, the cross member 60, which may be in the form of a piece of angle iron, is disposed above and secured at spaced positions to the upper edge of the V-shaped blade 59. Each end of the cross member 60 is in turn pivotally connected to a restraining link 61, the two links 61 serving to retain the cleaner in its operating position in relation to the heating drum 35. As shown, the links 61 extend downwardly and forwardly with the lower end of each link 61 pivotally connected to a bracket 62 that is in turn secured to the frame 31 of the dehydrator. The pivotally connected links 61 are furthermore of such length and so positioned that they permit only limited vertical movement of the cleaning apparatus 58 whereby it is free to ride with a floating action upon the surface of the belt 36 in such a manner that the blade 59 always maintains close contact with the belt. This is to say, the restraining links 61 are of such length that they permit sufficient movement but serve to limit the upward movement of the cleaner 58 to the extent that it is always maintained in proper relationship with the belt 36. Accordingly, should the point of the blade 59 catch on the surface of the belt, it will have sufficient freedom of movement to free itself but is restrained from excessive movement which might otherwise result in the cleaner capsizing upon the belt. By this arrangement it is apparent that any foreign object which may drop on the lower run of the belt will be deflected therefrom by the belt cleaner 58 thereby obviating damage which might otherwise result should the object pass between the belt and the drum.

As previously indicated, the cooling drum 34 is rotatably mounted in a fixed position at the right end of the frame 31 when viewed from the side shown in Fig. 1, whereas the heating drum 35 is mounted on the other end of the frame 31 in a manner providing for limited movement thereof in order to accommodate tensioning and tracking of the belt 36. To this end the fixed cooling drum 34 is rotatably mounted between a pair of bearings 64 that are firmly secured to the right end of the frame 31. On the other hand, the movable heating drum 35 is rotatably supported in a pair of bearings 65 that are carried respectively on the outer ends of a pair of ram structures 66. As shown, the rams 66 are slidably mounted in the frame 31 to constitute spaced supporting elements that straddle and engage the respective ends of the drum 35 and are arranged to provide for adjusting movement of the drum 35 relative to the drum 34 for tensioning the belt 36. Preferably the tensioning action is accomplished by controlled fluid pressure operating to effect simultaneous movement of the rams 66. As best shown in Fig. 6, the two rams 66 are arranged in the horizontal plane of the axes of the drums 34 and 35 and are spaced apart a distance greater than the width of the drums in order that they may engage and support the bearings at the respective ends of the heating drum 35. As shown in Figs. 4 and 6, the slidably mounted rams 66 are each received within a tubular sleeve or bearing shell 67, the two sleeves being fixed in the outer edges of the frame 31 at the heating drum end thereof. To provide for accommodating belts of somewhat different lengths the rams 66 are arranged to slide in and out a distance of about twelve inches whereby the position of the heating drum may be established in accordance with the length of the particular belt 36 being used on the machine.

In order that the rams 66 may be moved by power, the inner end of each ram is connected by a pivot pin 69 to one end of a horizontally disposed adjustable connecting rod system or element 71, the other end of which is connected by a pivot pin 72 at an intermediate position to a vertically disposed actuating lever 73 depending at the side of the frame 31. The two vertically disposed levers 73 at the respective sides of the frame 31 are carried on the opposite ends of a large transversely disposed shaft 74 that is journaled in the frame 31 just above the two connecting rods 71. The depending end of each lever 73 which extends to near the bottom of the frame 31 is pivotally connected to the outer end of a piston rod 75 that operates in a horizontally disposed double acting cylinder 76. Each cylinder 76 is in turn pivotally connected at its closed end by a pin 77 to a depending bracket 78 that constitutes part of the frame 31. As appears in Figs. 4 and 6, each bracket 78 is braced against the reaction of its cylinder 76 by two parallel tie rods 79 that extend therefrom upward and forward to the main frame 31. By this arrangement the levers 73 operate as levers of the second class with the lever arms so proportioned as to provide a substantial mechanical advantage to the piston rods 75 in moving the connecting rods 71. Thus, by exerting fluid pressure in the left end of each of the cylinders 76 as shown in Fig. 4 through a connecting conduit 80 the piston rods 75 are forced to the right, thereby moving the levers 73, the connecting rods 71 and the rams 66 to the right to tighten the belt 36.

As appears in Fig. 6 the transverse shaft 74 extends entirely across the frame 31 and is rigidly connected at its ends with the two depending levers 73 associated respectively with the two spaced rams 66. The shaft 74 constitutes a rigid member serving to interconnect the actuating mechanisms at the respective sides of the frame 31 in a manner to insure equal movement of the two rams 66 whereby both ends of the heating drum 35 are moved simultaneously and equally in tensioning the belt 36.

In accordance with a modified form of the tensioning structure that is shown in Fig. 5, each ram 66 is provided along its lower surface with rack teeth 81 that mesh with pinions 82 fixed on a rigid transverse shaft 84. The shaft 84 corresponds generally to the transverse shaft 74 shown in Figs. 4 and 6 in that it interconnects or interlocks the actuating mechanisms for the rams at the respective sides of the frame 31. In this modification, the shaft 84 has connected to each end a lever arm 85 that extends horizontally and is pivotally connected at its outer end to the upper end of a vertically disposed piston rod 86. Each piston rod 86 operates in a vertically positioned actuating cylinder 87, the arrangement being such that when the piston rods 88 are forced upward, the arms 85 are caused to turn the shaft 84 in clockwise direction whereupon the pinions 82 in mesh with the racks 81 urge the rams 66 to the right, as shown in the drawing, thereby moving the drum to tighten the belt. In this arrangement, the connections of the arms 85 with the ends of the shaft 84 may be effected by means of spline connections 88 or the like whereby angular adjustments of the arms are accomplished. This provides for changes in the position of the rams 66 relative to the piston rods 86 and lever arms 85 to take account of the length of the belt 36 whereby the slack may be taken up before pressure is exerted through the cylinder 87 to tension the belt.

In the tensioning apparatus shown in Fig. 4, this adjustment of the position of the rams 66 relative to the actuating levers 73 is effected by lengthening or shortening the adjustable connecting rod elements 71. As shown, the portion of the connecting rod which engages the pivot pin 69 is in the form of a threaded shaft 91 which cooperates in telescoped threaded relationship with a cylindrical nut 92. The nut 92 is swiveled or rotatably connected at its other end to a shaft member 93 that is in turn connected by the pin 72 to the lever 73. The nut 92 is provided about its periphery with a plurality of spanner receiving holes or sockets 94 that may be engaged by an actuating instrument such as a spanner or lever rod 95 shown in dot dash lines in Fig. 6. By inserting the lever 95 in one of the holes 94 in the nut 92, the nut may be turned to lengthen or shorten the connecting rod element 71, the lever 95 being moved from one hole to the next as the nut is turned by increments.

One of the advantages of employing a material conveyer of the drum and belt type in a dehydrator arises from the fact that the smooth material carrying surface can be renewed readily simply by replacing the belt. When it is desired to replace the belt with a new one, a gauge plate or block 98 shown in dot dash lines in Fig. 4 is temporarily placed upon each of the piston rods 75, and the tensioning pressure then relieved from the cylinder 76 through the conduit 80. This permits each piston rod 75 and the connected actuating lever 73 to move to the left but only to the vertical position shown in the drawing whereupon the gauge block 98 is clamped between the lever 73 and the end of the cylinder 76 thereby preventing further movement in the retracting direction.

With the actuating lever 73 in the vertical position, the adjusting nut 92 is disposed directly behind a small cover plate 99 shown on the side of the frame 31 in Fig. 1. Upon removing the cover plate 99, an opening is presented in the side of the frame 31 through which the lever 95 may be inserted to turn the nut 92 as previously explained. To slacken the belt 36, the nuts 92 are turned in the direction to shorten each connecting rod element 71 thereby retracting the associated ram 66 into the frame 31 and moving the heating drum 35 inwardly toward the cooling drum 34. In effecting this movement, the nuts 92 on the opposite sides of the frame 31 are turned simultaneously in order that both rams 66 may be retracted equally. When the rams have been retracted to their fullest extent, the belt 36 is quite slack and can then be cut through and removed from the drums. A new piece of belt material is then cut to length and placed about the drums 34 and 35 and its two ends welded together to form a continuous endless web. The new belt is preferably made as long as it is possible to use in the dehydrator in order that it may include sufficient material to provide for shortening and rewelding subsequently in the event that it should be accidentally damaged.

After the welding is completed, the belt is centered on the drums and the two adjusting nuts 92 are turned simultaneously to advance the rams 66 out of the frame 31 for moving the drum 35 in the direction to tighten the belt. As the belt becomes taut, the two nuts 92 are carefully adjusted to insure that the degree of tightness is the same in both edges of the belt. After each of the nuts 92 has been properly tightened sufficiently, the cover plates 99 are replaced and fluid pressure is admitted through the conduit 80 into the two actuating cylinders 76 to force the piston rods 75 and the levers 73 to the right as shown in Fig. 4. The temporary gauge plates 98 are then removed from the piston rods 75 and the fluid pressure in the cylinders is regulated to establish the desired degree of tension in the belt 36. Since the nuts 92 have been tightened with the levers 73 in their central vertical positions, the levers are free to swing in either direction from the central position as may be required to accommodate any change in the length of the belt 36 resulting from changes in temperature or other operating conditions. Inasmuch as the tensioning pressure exerted through the conduit 80 into the cylinders 76 may be maintained constant, the tensioning action of the piston rods 75 remains constant and the tension in the belt is maintained constant regardless of changes in the temperature and other operating conditions.

As explained in the previously mentioned copending application Serial No. 364,458, filed June 26, 1953, of which this specification is a continuation in part, proper tracking of the belt 36 in running over the drums 34 and 35 is effected by tilting the heating drum 35 in a vertical plane. This is accomplished automatically through operation of an electrically actuated servo-motor mechanism. As best shown in Fig. 4, the ram 66 that appears on the near side of the frame 31 in that view is pivotally connected at its outer end by means of a pivot pin 101 to an extending arm or swinging link 102 that carries at its outer or distal end the bearing 65 that supports the near end of the drum 35. A second pin 103 disposed above the pivot pin 101 is loosely fitted in oversize holes in the arm 102 and an upward extension at the outer end of the ram 66 respectively in such a manner as to permit but limit the extent of the vertical swinging movement of the arm or swinging link 102. The lower edge of the swinging link 102 is provided with a series of spaced holes 104, one or another of which is engaged by a pin 105 that connects the swinging link to the upper end of a vertically disposed tracking link 106. The lower end of the tracking link 106 is in turn connected by a pin 107 to the upper end of a tracker rod 108 extending upwards through the shell of the housing 21 from a motor driven tracker mechanism 109 that is mounted below the housing.

The tracker mechanism 109 is driven by a reversible motor 111, the arrangement being such that when the motor 111 is operated in the one or the other direction, the tracker rod 108 is caused to move upwardly or downwardly through operation of a screw and nut device or the like within the tracker mechanism 109. This results in pivoting the swinging link 102 vertically thereby tilting the drum 35 in the one or the other direction to effect a correction in the tracking of the belt 36 in running over the drum 35. As appears in Fig. 4, since the motor 111 and the tracker mechanism 109 are mounted below the housing 21 and outside of the vacuum chamber, the vertically movable tracking rod 108 extends into the chamber through a suitable packing gland 112 that prevents leakage of air into the chamber.

The amount of lost motion between the pin 103 and the oversize holes in the ram 66 and in the swinging arm 102 is sufficient to permit the degree of pivoting movement of the arm necessary to accommodate the tilting movement of the drum 35 required in tracking the belt. When the length of the belt 36 is changed through replacement or re-welding, it may be necessary to change the point of connection of the tracking link 106. To accomplish this, the swinging link 102 is lowered by retracting the tracking rod 108 to the extent permitted by the lost motion at the limiting pin 103. With the weight of the drum 35 supported by the pin 103 in this manner, the tracking link 106 may then be disconnected by withdrawing the pin 105 without danger that the drum 35 will be tilted too far. The tracking link 106 is then moved to and aligned with the particular hole 104 in the swinging link 102 which disposes it in the most nearly vertical position when the belt is taut. The pin 105 is then replaced whereupon the tracking apparatus may resume operation. By this arrangement the swinging link 102 and its associated lost motion pin 103 permit the required vertical tilting movement for the tracking action without changing the tension in the belt while the pivotally connected tracking link 106 permits the horizontal movement of the drum 35 required in tightening the belt without interfering with the operation of the tracking apparatus. The bearings 65 that support the ends of the drum 35 are preferably of the self-aligning type arranged to permit canting of the drum 35 in effecting the tracking action without causing interference between the drum and the pivoted supporting arms 102 or binding between the rams 66 and their cooperating cylinders 76.

As fully explained in the previously mentioned parent application Serial No. 364,458, the belt tracking action is governed by the movements of a belt follower roller such as the roller 113 shown in Fig. 4. As there shown, the follower roller 113 is disposed in position to engage and roll upon the near edge of the belt 36 as it passes by in running off the heating drum 35. The follower roller 113 is rotatably mounted on the upper end of a swinging arm 114 fixed to one end of a horizontal shaft 115 rotatably mounted in a bracket 116 carried by the drum supporting ram 66. The shaft 115 is connected at its other end to and operates control linkage 117 that is connected with and actuates a double acting tracker control switch 118. Thus, when the belt 36 runs toward the far end of the drum 35 and its near edge moves inward together with the follower roller 113, the shaft 115 is turned in the bracket 116 and the linkage 117 operates to close a set of lower contacts 119 of the tracker control switch 118. Conversely, when the belt 36 departs from its central position toward the near end of the heating drum, the control linkage 117 operates to close a set of upper contacts 120 of the tracker switch 118. When actuated in this manner the switch 118 controls the operation of the tracker motor 111 so that it effects tilting movement of the drum 35 in the correct direction to overcome the tendency of the belt to depart from its central position on the drum. As shown in Fig. 4, the switch 118 is carried by the swinging link 102, the arrangement being such that the correcting movement of the swinging link 102 tends to reopen the switch contacts.

As shown in the circuit diagram of Fig. 16, electrical energy for operating the tracker motor 111 is obtained from a power source represented by line conductors L1, L2 and L3. From the line conductors L1, L2 and L3 a circuit breaker 121, provided with the usual protective apparatus, connects the power source to a pair of motor-controlling or reversing switches 122 and 123 that are in turn connected to the tracker motor 111 in a manner respectively providing for operation of the motor in forward and reverse direction. A control circuit for the motor switches leads from line conductor L2 through the circuit breaker 121 and a conductor 125 to a control switch or circuit breaker 126. With the switch 126 closed a control circuit is established through a conductor 127 leading to switch actuating coils 128 and 129 that are associated with and arranged to operate the motor reversing switches 122 and 123 respectively. As shown, the actuating coil 128 associated with switch 122 is connected by a conductor 131 to the lower switch contacts 119 of the tracker switch 118. From the contacts 119 the circuit extends through a conductor 132, a lower limit switch 139 associated with the tractor mechanism 109 and a return conductor 134 that is connected with a grounded return line 135 which constitutes the other side of the control circuit that originated from the switch 126.

In a similar manner the actuating coil 129 of the other motor reversing switch 123 is connected by a conductor 137 with the upper contacts 120 of the tracker switch 118 from which the circuit leads through a conductor 138 connected with an upper limit switch 133 to the return conductor 134. Thus, when the lower tracker switch contacts 119 are closed, the switch actuating coil 128 is energized to close the switch 122 which causes the tracker motor 111 to operate in a direction to move the pivotally mounted swinging link 102 and the near end of the drum 35 downwardly, the lower limit switch 139 serving to break the control circuit and stop the motor 111 in the event that the downward movement exceeds a predetermined amount. Conversely, when the upper tracker switch contacts 120 are closed, the actuating coil 129 is energized thereby closing the switch 123 to operate the motor 111 in the direction to move the swinging link 102 upward, the upper limit switch 133 then serving to break the control circuit in the event of excessive upward movement.

The opposite end of the heating drum 35 may be supported as shown in Fig. 2 by means of a swinging link 142 that is pivotally connected by a pin 143 to the extending end of the corresponding ram 66, a lost motion connecting pin 144 being provided to permit limited swinging movement of the link 142 in a manner similar to that explained in connection with the swinging link 102 shown in Fig. 4 to which the tracker mechanism is connected. In the case of the swinging link 142 shown in Fig. 2, no swinging movement is required during tracking and the link is accordingly supported by a rigid supporting link or strut 146 the lower end of which is pivotally connected to the frame 31 by a pivot pin 147. The upper end of the link 146 is connected by a pin 148 that fits in any one of several holes 149 in a dependent portion of the swinging link 142. By this arrangement the supporting link 146 permits sliding movement of the ram 66 in tightening the belt 36, the link 146 being disposed as nearly vertically as possible and connected to the arm 142 at one or another of the several holes 149 depending upon the length of the belt. Since the link 146 is equal in length to the link 106 at the other end of the drum 35, both ends of the drum will move along similar paths when the two rams 66 are moved simultaneously.

As an alternative construction the swinging link 142 may be dispensed with and the ram 66 at the end of the drum opposite the tracker mechanism may be provided with a rigid extension 152 in the manner shown in Fig. 1. In this instance, the ram 66 and its extension 152 form a rigid cantilever beam slidably mounted in the frame 31 for supporting the end of the heating drum 35 opposite that to which the tracker mechanism is connected.

Figure 11:
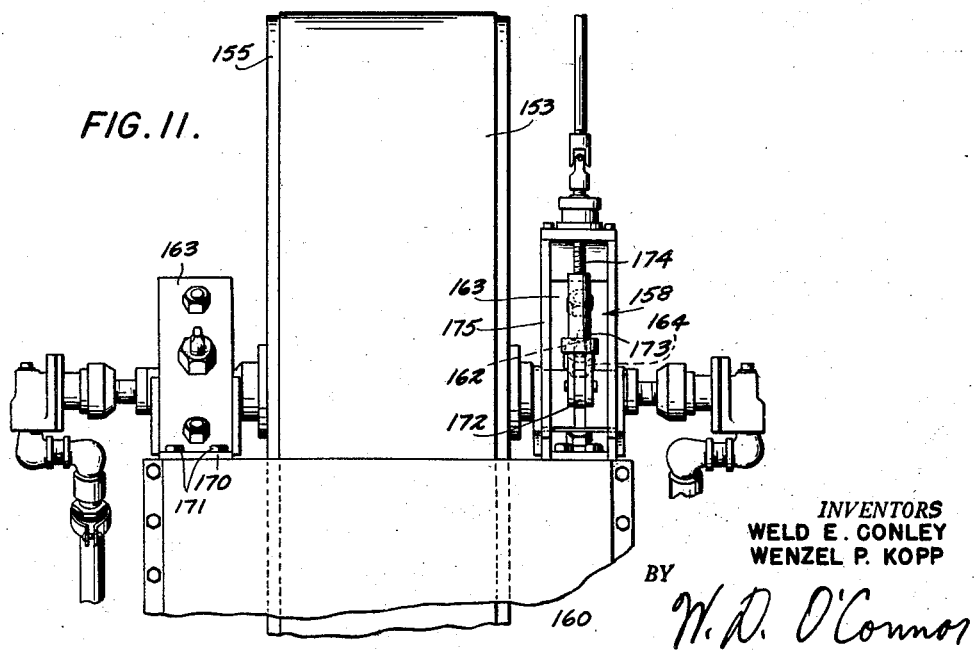
Fig. 11 is a view in end elevation of the modified drum supporting structure shown in Fig. 10.

In the previously mentioned copending parent application Serial No. 364,458, the movably mounted drum and associated adjusting mechanism therein illustrated is arranged as shown in Figs. 10 and 11 of the present drawings. As there shown, a conveyer belt 153 generally similar to the previously mentioned belt 36, but much shorter, runs over a heating drum 155 generally similar to the heating drum 35. The drum 155 is rotatably mounted at its opposite ends in bearings 157, the housings of which are in turn slidably mounted in yokes or brackets 158. The brackets 158 constitute sub-frames that are pivotally mounted by means of pins 159 to the sides of a frame 160 that corresponds generally to the main frame 31 shown in Figs. 1 and 4. As shown in the drawing, each sub-frame or yoke 158 comprises a pair of upper and lower guide bars 161 which pass through complementary openings in the associated bearing housing 157 to provide for sliding movement of the bearings along the yokes in a generally horizontal direction for moving the heating drum 155 in direction to tighten or loosen the conveyer belt 153. To maintain the slidably mounted drum supporting bearings 157 in adjusted position, each bearing housing is provided with a threaded rod 162 disposed parallel with and centrally of the guide bars or rods 161 and projecting through a hole in a plate 163 that is secured to the outer ends of the guide bars 161 in a manner to form one end of the yoke 158. A nut 164 threaded on the rod 162 may be tightened to bear against the end plate 163 for holding the bearing 157 outwardly to maintain tension in the belt 153. The inner ends of the guide bars 161 are connected to an end plate or base member 165 that forms the inner end of the yoke 158 and receives the pivot pin 159 which pivotally mounts the yoke or sub-frame 158 on the main frame 160.

When it is desired to establish the required operating tension in the belt 153, the bearings 157 are moved outwardly along the guide rods 161 through the action of hydraulic jacks 166 that are interposed temporarily between each bearing housing 157 and the associated base or end plate 165 that receives the pivot pin 159. As shown, each jack 166 has associated with it a pressure gauge 167 by means of which the pressure upon the bearing 157, and therefore the tension in the belt 153, may be ascertained with accuracy. A hand operated hydraulic pressure pump 169 is connected to each jack 166 to actuate it, the arrangement being such that by operating both pumps 169 simultaneously, the two bearings 157 at the opposite ends of the drum 155 may be advanced together. The gauges 167 associated with the two jacks 166 are observed as the pressure is applied until both show predetermined readings indicating that the desired tension has been established in the belt 153. When the predetermined pressure has been achieved in the jacks 166, the nuts 164 are turned down on the threaded rods 162 until they bear against the outer end plates 163 and are then tightened somewhat until the gauges 167 indicate, by a reduction in pressure reading, that the forces restraining the bearings 157 in adjusted position are being assumed by the nuts 164. When this occurs, the hydraulic pressure on the jacks 166 may be relieved and the jacks removed from the machine with assurance that the belt 153 is under the desired degree of tension for proper operation.

As in the case of the apparatus shown in Fig. 4, tracking of the belt 153 on the drum 155 is effected through tilting the drum one way or the other by pivoting action of one of the bearing supporting yokes or brackets 158 under the control of servo-motor mechanism such as the tracker mechanism 109 indicated in Fig. 4. As best shown in Fig. 11, the pivotally mounted yoke 158 that is shown at the left, although connected to the frame 160 by the pivot pin 159, is restrained from pivoting movement relative to the frame by means of an extending arm 170 that projects from the lower edge of the outer end plate 163 and is rigidly secured to the frame 160 by cap screws 171. On the other hand, the yoke 158 at the right in Fig. 11 is left free to pivot on its pivot pin 159 and is provided with an extending arm 172 that is secured to its outer end plate 163 and has pivotal connection at its outer end with the lower end of a nut element 173 that constitutes part of a follower mechanism. The nut element 173 is threaded on a vertically disposed adjusting screw 174 that is rotatably mounted in a bracket 175 fixed on and projecting upward from the side of the frame 160. When the screw 174 is rotated in the one or the other direction by suitable follower controlled actuating mechanism of the type described in connection with Figs. 4 and 16, the nut 173 is moved up or down to raise or lower the outer end of the yoke 158, thereby tilting the drum 155 to provide for correcting the operation of the belt in running over it. By this arrangement the tilting movement of the drum 155 in effecting tracking of the belt 153 may be accomplished without substantially changing the tension in the belt since the tracking movement is effected in direction transverse to the belt tightening movement. As a corollary, the belt tightening action can be effected by sliding the bearings 157 along the guide rods 161 without changing the tracking characteristics, since the direction of the tightening movement is transverse to the direction of the tracking movement.

As previously mentioned, in the belt tensioning arrangement shown in Fig. 4 the desired tension in the belt 36 is established and maintained by fluid pressure acting within the cylinders 76 that is supplied through the conduit 80, the tension being adjusted as desired by varying the fluid pressure. The fluid pressure system for accomplishing this purpose is illustrated diagrammatically in Fig. 16 in which the conduit 80 is shown connecting the upper sides of the left, or pressure ends of the two cylinders 76, with a pressure reservoir or tank 181. The tank 181 is disposed in an elevated position relative to the cylinders 76, preferably on the top of the housing 21 as shown in Figs. 1 and 12. The fluid utilized for exerting pressure within the cylinders 76 is preferably water, to which the required pressure is applied by air under pressure, the tank 181 being only partially filled with water.

The air under pressure is supplied from a pressure source represented by a conduit 182 from which it flows through an adjustable pressure regulating valve 183 and a conduit 184 into the top of the tank 181. The pressure exerted upon the water in the tank 181 is usually in the order of seventy or eighty pounds to the square inch and it may be regulated as desired by adjusting the regulating valve 183 thereby regulating the water pressure in the cylinders 76 and the tension in the belt 36. As previously explained, pressure in the left ends of the cylinders 76 causes the rams 66 supporting the heating drum 35 to be moved to the right as shown in Figs. 4 and 16, thereby tensioning the belt 36. Since the belt 36 is quite long, its length changes somewhat under different temperature conditions, but any change in length in the belt that may occur during operation of the dehydrator results merely in movement of the rams 66 and the piston rods 75 without effecting any appreciable change in the tensioning force exerted by the fluid pressure in the cylinders 76.

A branch conduit 185 leading from the air pressure conduit 184 is connected with two pressure responsive switch mechanisms 186 and 187, the arrangement being such that the switch 186 is responsive to insufficient pressure in the system while the other switch 187 is responsive to excessive pressure. The two switches 186 and 187 are operatively connected to stop the belt driving motor 40 in the event that the tensioning pressure in the system should exceed a predetermined maximum or fall below a predetermined minimum, whereby operation of the belt 36 under improper tensioning is prevented. The belts employed in this apparatus may be extremely thin and are easily broken by excessive tensioning pressure so that the operation of the switch 187 prevents breakage of belts by running the belt under excessive tensioning pressure, thereby avoiding unnecessary shutdowns to repair or replace a broken belt. Furthermore, the switches 186 and 187 may also be connected to actuate warning signals such as an electric light or a bell (not shown) in addition to, or instead of, operating to stop the motor 40.

When it is desired to slacken the belt 36, the air under pressure from the source 182 may be shut off by closing a valve 189 in the pressure conduit after which a vent valve 190 connected with the conduit 184 may be opened. This releases the air pressure in the tank 181 thereby relieving the pressure on the water in the closed ends of the cylinders 76. A second pressure tank 191 mounted on the top of the housing 21 adjacent to the tank 181 is arranged to provide pressure for effecting retracting movement of the rams 66 and the heating drum 35 when it is desired to slacken the belt. As previously explained in connection with Fig. 4, the gauge blocks 98 may be interposed between the cylinders 76 and the levers 73 before the belt is slackened to position the levers vertically during adjustment of the positioning nuts 92.

As shown in Fig. 16, the tank 191 is connected by a conduit 192 to the upper sides of the right ends of the two cylinders 76. In this instance, water under relatively low pressure is supplied to the cylinders, the pressure being exerted by air flowing through a pressure regulating valve 193 from a pressure source represented by a conduit 194. The valve 193 is connected by a conduit 195 to the top of the tank 191 in such a manner that the air pressure exerted through it into the tank acts upon the water therein forcing it through the conduit 192 into the right ends of the cylinders 76 for retracting the piston rods 75. Since the retracting action requires little force, a pressure in the order of ten pounds per square inch has been found sufficient in most instances. After the belt tensioning mechanism has been retracted and the necessary adjustments to or replacement of the belt effected as previously described, the nuts 92 may be retightened and the retracting pressure may be cut off by closing a valve 199 in the conduit 194 and opening a vent valve 200 connected with the conduit 195. The gage blocks 98 are then removed and the belt 36 may then be tensioned as previously explained by opening the valve 189 to admit pressure into the tank 181 from which water under pressure is forced through the conduit 80 into the left ends of the cylinders 76.

Since the tank 191 is partially filled with water, the conduit 192 leading to the right end of the cylinders always remain full of water as do the right ends of the cylinders 76, the water flowing to or from the vented tank 191 as the piston rods 75 move in and out in maintaining the belt tension, there being no pressure in the retracting end of the cylinders other than the static head of the water in the pipe 192. Because of their location, the cylinders 76 are subjected to the heating influence of the heating drum 35 and the radiant heaters 51 and 52. This heating action tends to have a deleterious effect upon heat sensitive packing material 201 within the cylinders that is arranged in the usual manner to form a tight connection between the pistons on the piston rods 75 and the cylinder walls. Since during the operation of the dehydrating apparatus the tensioning pressure is applied continuously to the left ends of the cylinders 76, the right or retracting ends of the cylinders are always under the low pressure of the static head and the water in them, therefore, is adapted to serve as a cooling agent to cool the cylinders. The tank 191 being located outside of the housing 21 is not subjected to the heating action and, therefore, water passing from the cylinders to the tank through the conduit 192 may be cooled in the tank 191 which then operates as an expansion tank and heat radiator. Should the cylinders become so hot that the water reaches the boiling point, the hot water and any steam formed will expand and pass up through the conduit 192 and be replaced by cool water returning from the tank 191. To facilitate the circulation of the water, a second conduit 202 may be connected from the bottom of the tank 191 to the lower sides of the right ends of the cylinders 76 as shown in the drawing. This provides for a return flow of cool water from the expansion tank to the cylinders 76, in accordance with the thermo-syphon system of circulation. The cooling action thus provided serves to cool the metal walls of the cylinders 76 throughout their entire lengths by conduction of heat and thereby protects the piston packing material from injury through overheating.

As previously explained, the motor 40 shown in Fig. 12 and represented diagrammatically in Fig. 16 is operatively connected to rotate the cooling drum 34 thereby driving the belt 36. As shown in the diagram, the motor 40 is energized from the line conductors L1, L2 and L3 through branch conductors 205, 206 and 207 that are connected by closing a disconnect switch 208 to a motor control switch 209 through which they are in turn connected respectively to conductors 211, 212 and 213 leading to the motor 40.

The control circuit for the motor 40 originates from the previously mentioned control switch or circuit breaker 126 and leads through the conductor 127 and a conductor 215 to a starting push button switch 216 which when closed completes the circuit through a conductor 217 to an actuating coil 218 of the motor controlling switch 209. From the coil 218 a return circuit leads through conductor 219 and a stop push button switch 220 to a return conductor 221 that constitutes part of an interlocking circuit to be subsequently explained. When the actuating coil 218 is thus energized, the motor switch 209 is closed to start the motor 40 at the same time closing interlocking contacts 223 that complete a holding circuit leading from the control conductor 215 through the closed contacts 223 to a conductor 224 which leads to the coil 218 in parallel relationship with the starting push button switch 216 and the conductor 217.

As more fully explained in the previously mentioned copending application Serial No. 364,458, the doctor blade 53 which scrapes the dried material from the belt 36 is arranged to be oscillated transversely of the belt 36 through operation of mechanism driven by a motor 227 shown in Fig. 12. As shown in the diagram, Fig. 16, the motor 227 is energized from the line conductors L1, L2 and L3 through branch conductors 231, 232 and 233 which are connected by means of a disconnect switch 234 and a motor control switch 235 to conductors 236, 237 and 238 respectively that lead to the terminals of the motor 227. The control circuit for the oscillating motor 227 is derived from the control switch 126 and the control conductor 215 through the interlocking contacts 223 of the belt driving motor switch 209 and the conductor 224. As shown, a push button starting switch 241 is arranged to complete the circuit by establishing a connection from the conductor 224 to an actuating coil 242 of the motor controlling switch 235, the coil 242 being in turn connected by a stop push button switch 243 and a return conductor 244 to the grounded line 135.

With the actuating coil 242 thus energized, the motor switch 235 closes to start the motor 227 and at the same time closes interlocking contacts 245 which effect a shunt connection or holding circuit from the conductor 224 to the coil 242 to maintain the coil energized after the push button starting switch 241 is released. By this arrangement the control for the doctor blade oscillating motor 227 is energized through the interlocking contacts 223 of the switch 209 which controls the belt driving motor 40. As a consequence, the oscillating action of the doctor blade cannot be effected until after the belt driving motor is started and, furthermore, the oscillating motor stops whenever the belt driving motor stops. This interlocking arrangement thereby prevents oscillation of the doctor blade 52 when the belt 36 is not moving, which might otherwise result in damaging the belt through wear caused by oscillating the blade 53 in engagement with one section of the belt continuously.

The previously mentioned radiant preheater 51 and afterheater 52 are likewise energized from the line conductors L1, L2 and L3. As shown in the circuit diagram, branch conductors 246, and 247 lead from line conductors L2 and L3 respectively to a control box 248 from which conductors 249 and 250 lead to opposite terminals of the radiant preheater 51. In a similar manner, branch conductors 252 and 253 lead from line conductors L1 and L2 respectively to a control box 254 from which conductors 255 and 256 lead to the respective terminals of the radiant afterheater 52.

The control boxes 248 and 254 include control apparatus of the saturable reactor type. These units are each provided with two sets of control contacts 257 and 258 respectively connected in series circuit relationship as shown. As long as either of these contacts is open, the control units operate as reactors to limit the flow of electricity to the heaters with the result that they operate at a low heating capacity. When both the contacts 257 and 258 are closed the control units permit the flow of sufficient electricity to operate the radiant heaters at full capacity. As shown in the diagram the contacts 257 of each control unit are associated with pressure responsive switches 259, both of which are connected by a conduit 260 to the vacuum chamber within the housing 21. The vacuum switches 259 are so arranged that the contacts 257 remain open unless the pressure within the housing 21 is below a predetermined maximum. That is to say the contacts 257 are closed only when a predetermined degree of vacuum exists within the vacuum chamber. The interlocking contacts 258 constitute parts of switches provided with actuating coils 261 both of which are connected to the control conductor 224 that is energized through the interlocking contacts 223 of the belt motor switch 209. Return conductors 262 serve to connect the other terminals of the coils 261 to the ground conductor 135.

By this arrangement the two radiant heaters 51 and 52 can be operated up to full capacity only when both the vacuum within the chamber 21 is sufficient and the belt driving motor 40 is energized to move the belt. Conversely, whenever the vacuum in the chamber becomes insufficient, the contacts 257 are opened thereby reducing the heating action, and likewise, whenever the belt driving motor 40 is de-energized, the motor switch contacts 223 are opened and the interlocking control contacts 258 open to reduce the heating action. By this arrangement, material being carried on the belt 36 is prevented from being over-heated by the heaters 51 and 52, either by reason of the vacuum not being sufficient and, therefore, its cooling action inadequate, or by reason of the belt stopping with the material thereon subjected to continuous heating.

Inasmuch as the control circuit is energized from the line conductor L2 through the tracker motor circuit breaker 121, it is apparent that should the circuit breaker 121 open to stop the tracker motor 111 because of an overload or the like, the entire control circuit would be de-energized thereby stopping the belt driving motor 40 and the blade oscillating motor 227 as well as reducing the heating effect of the radiant heaters 51 and 52.

As explained in the previously mentioned copending application Serial No. 364,458, with respect to the heating drum, and as indicated in Fig. 16, there is provided adjacent to the edges of the heating drum 35 a pair of limit switches 264 and 265 respectively disposed in position to be engaged by the one or the other edge of the belt 36, should it run off either edge of the drum 35. In like manner limit switches 266 and 267 are disposed adjacent to the respective edges of the cooling drum 34. By this arrangement, should the belt 36 run off either edge of either the drum 34 or the drum 35, it will contact and open the associated limit switch.

As shown in the drawing, the four belt edge limit switches are connected in the previously mentioned return circuit of the interlocking control system for the switch 209 operating the belt driving motor 40. To this end, the return conductor 221 leading from the belt motor stop push button switch 220 is connected to the limit switch 266 at the near edge of the cooling drum 34. A conductor 269 connects the limit switch 266 in series with the limit switch 267 at the far edge of the drum 34. From the limit switch 267 a conductor 271 leads to the low pressure responsive switch 186 of the previously described belt tensioning pressure system which is in turn connected by a conductor 272 to the high pressure responsive switch 187. The circuit then continues from the tensioning pressure limit switches through a conductor 273 which connects with the belt edge limit switch 265 at the far edge of the heating drum 35. A conductor 274 connects the limit switch 265 in series with the limit switch 264 at the near edge of the heating drum 35. From the limit switch 264 a conductor 275 leads to an upper limit switch 276 associated with the tracker mechanism 109. The upper limit switch 276 is connected in series with a lower limit switch 277 of the tracker mechanism which is in turn connected to the return line 134 that completes the circuit to the ground conductor 135.

From the description of this circuit, it is apparent that in order to operate the belt driving motor 40, it is necessary that all of these various limit switches and pressure switches remain closed. Conversely if any one of the several switches in the return circuit is opened, the control circuit through the switch coil 218 will be opened and the belt driving motor 40 de-energized. Thus, should the belt 36 run off either edge of either drum, or the tracker mechanism exceed its normal limits in either direction, or the tensioning pressure become either higher or lower than normal, one or another of the limit switches will open thereby breaking the control circuit and de-energizing the switch actuating coil 218 of the motor controlling switch 209. As previously explained, de-energizing the control circuit in this manner thereby opening switch 209 not only stops the belt driving motor 40, but also results in stopping the doctor blade oscillating motor 227 and in reducing the heating effect of the radiant heaters 51 and 52. Thus, should the belt 36 operate abnormally for any reason, its driving motor and the doctor blade oscillating motor will be stopped to prevent damage to the belt and at the same time the heating action will be reduced to prevent overheating of the material on the belt after the belt stops.

In tracking the belt, the contacts 119 and 120 of the tracker control switch 118 are actuated by operation of the follower roll 113 and when one or the other is closed, it remains closed only until the tracker jack mechanism 109, in responding, moves the arm or swinging link 102 (see Fig. 4) together with the switch 118, which the arm carries a sufficient distance to thereby open the switch contacts. If the belt fails to return promptly to the central position, the contacts of the tracker control switch 118 will close again and the tracker jack will again operate to make an additional correction. If for some reason the tracker motor 111 should continue to operate until the tracker jack mechanism reaches the limit of its stroke before the tracker switch contact is opened, the jack will engage and open one or the other of the tracker limit switches 133 or 139 which will stop the tracker motor 111. When this occurs, the belt will usually return toward its central position and in doing so will move the follower roller 113 causing it to close the opposed tracker switch contact thereby energizing the tracker motor 111 for operation in the other direction. If, for some reason, the tracker mechanism contacts do not operate properly and the belt does not correct itself, but continues to run to one side, then one or another of the belt limit switches 264, 265, 266 or 267 will be engaged and opened to break the main control circuit and stop the belt driving motor 40 and the other apparatus as previously explained. Likewise if the tracker motor limit switch 133 or 139 should fail to operate, the corresponding tracker limit switch 276 or 277 will open to break the interlocking control circuit and stop the belt driving motor 40.

As previously mentioned, the liquid material to be dried is applied to the lower surface of the belt 36 by means of the feeding roller 46. As shown in Fig. 7, the feeding roller 46 is rotatably mounted at its ends in bearings 281 each of which is carried by a pivotally mounted bracket or sub-frame 282 that is movably connected at its right end, as shown in the drawing, to the main frame 31 by means of a pivot pin 283. The other, or left, end of each sub-frame 282 is provided with a projecting lug 284, the outer end of which presents an opening for receiving a vertically disposed adjusting screw 285. This arrangement is generally similar to the mounting for the feeding roller shown and described in copending application Serial No. 364,458. As explained therein, pivoting movements of the sub-frames 282 provide for positioning the feeding roller 46 closer to, or farther from, the belt whereby the thickness of the film of material applied to the belt for drying may be regulated. As shown in the drawing (Fig. 7), the adjusting screw 285 has threaded engagement at its upper end with complementary internal threads formed in a stationary bracket 286 secured to the frame 31. A stop nut 287 threaded on the screw 285 rotatably engages the upper surface of the lug 284 on the sub-frame 282 and serves to limit the extent of upward movement upon engaging the lower surface of the bracket 286. The lower surface of the lug 284 is engaged by a collar 288 which is pressed against it by a compression spring 289 thereby forcing the lug 284 upward against the stop nut 287, the lower end of the spring being supported by a lock nut 290 threaded on the shaft of the screw 285 in a manner to provide for adjusting the tension of the spring 289.

In order to adjust the position of the feeding roller 46 relative to the belt 36, the adjusting screw 285 is turned in the threaded bracket 286 in a manner to cause it to move up or down thereby moving the lug 284 accordingly and pivoting the sub-frame 282 about the pivot pin 283. This causes the roller 46 to be moved closer to, or farther from, the belt 36, and since each end of the roller may be moved independently, appropriate adjustments may be made to ensure that the material film is of pre-determined thickness across the full width of the belt 36. The adjusting screw 285 may be turned from beneath the housing 21 by means of an adjusting shaft 292 that passes upward through a packing gland 293 in the bottom of the feeding pan 47. The upper end of the shaft 292 is connected to the lower end of the adjusting screw 285 by a universal joint connection 294. The adjusting shaft 292 is arranged to be actuated from the exterior of the housing 21, and is provided with a suitable indicating dial as explained in the copending application Serial No. 364,458 whereby the amount of adjusting movement of the feeding roller 46 may be observed.

After the feeding roller 46 has been adjusted and the apparatus is in operation, should any solid object enter between the feeding roller and the belt 36 or between the backup roller 48 and the belt, the springs 289 afford an automatic releasing action whereby the roller 46 may move downward through pivoting the frames 282 and compressing the springs 289. By this arrangement the apparatus is protected from injury which might otherwise result should some solid object inadvertently pass between the belt and either the backup roller or the feeding roller.

From the feeding roller 46 the material to be dried is carried by the belt 36 around the heating drum 35 at one end of the housing and then to and around the cooling drum 34 at the other end of the housing as previously explained. In order to facilitate the cooling action of the cooling drum 34 and to prevent further heating of the material on the belt in that region by radiant heat, the end of the housing 21 that encloses the cooling drum is isolated thermally from the remainder of the housing. This is accomplished by means of a circumferentially disposed cooling jacket 297 which encircles the housing 21 in the region just inwardly of or to the left of the axis of the cooling drum 34, as shown in Fig. 1. The cooling jacket 297 is formed by placing together two of the reenforcing rings 28 in such a manner as to constitute therebetween a circumferential passageway or channel 298 for cooling fluid. As best shown in Fig. 12, the channel 298 is interrupted or closed at one point by a partition, or dam, 299, shown at the right in the drawing. Coolant fluid may be admitted to the channel 298 through an inlet conduit 301 that connects with the channel just below the partition 299. The entering coolant then flows down underneath the housing, up around and over the top thereof through the annular channel 298 and escapes through an outlet conduit 302 that connects with the channel just above the partition 299. The outlet conduit 302 discharges into a supply tank 303 from which the coolant fluid is circulated by a pump 304 that forces it through the inlet conduit 301 and into the channel 298.

Because of the action of the heating drum 35 and the radiant heaters 51 and 52, the housing 21 is subjected to and absorbs a considerable amount of heat radiated from these heat sources and likewise from the belt and the material being dried on it. The heat thus absorbed in the housing 21 tends to flow longitudinally through it in a manner to equalize the temperature throughout the length of the housing. If this heat were permitted to flow into the right end of the housing as shown in Fig. 1, some heat would be radiated from the inside of the housing wall to the dry material on the belt 36 that is in the process of being cooled by the cooling drum 34, thereby detracting from the cooling action. With coolant fluid flowing through the channel 298 around the housing 21, however, a circumferential band of the housing wall is cooled and the heat tending to flow in the housing wall toward the cool end thereof is intercepted by this cool band and absorbed by the coolant fluid. This prevents the heat from traveling farther and results in maintaining the part of the housing beyond the cooling jacket 297 in a cool condition in order that it may absorb heat from the dried material rather than transmit heat to it thereby facilitating the ccooling action of the cooling drum 34.

As previously mentioned, the dried material on the belt 36 is scraped off by the doctor blade 53 just as the belt is about to recede from the cooling drum 34. As best shown in Fig. 1, the dried material scraped from the belt falls into a receiving trough 305 disposed transversely of the housing 21 beneath the doctor blade 53. The bottom of the trough 305 is of semi-cylindrical shape for receiving a transverse conveyer screw 306 that is rotatably mounted therein. The conveyer screw 306 is arranged to be driven by a reversible electric motor 308 that operates to drive it by means of an interconnecting transmission mechanism 309. As best shown in Fig. 12 the respective ends of the screw conveyer trough 305 connect with discharge ports, or air lock valves 311, through which the dried product may be discharged from the housing 21. Suitable product receiving containers 312 are removably secured beneath the housing 21 in communication with the respective discharge ports 311.

In the operation of the dehydrator the dried product is discharged through one of the ports 311 into one of the containers 312 until the container is filled. The direction of rotation of the conveyer screw 306 is then reversed by reversing the motor 308 whereupon the dried product is moved by the conveyer screw in the opposite direction to divert it to the other discharge port 311 through which it then flows into the other container 312. Meanwhile the discharge lock 311 associated with the filled container 312 is closed whereupon the filled container is removed and an empty container substituted in its place. Thus, by filling the containers alternately, the opportunity is provided for removing a filled container from one port 311 and substituting an empty one during the time that the container at the other port 311 is being filled by dried product discharged into it through that port.

As inidcated diagrammatically in Fig. 12, power for operating the reversible conveyer motor 308 is derived from line conductors L1, L2 and L3 through one or the other of a pair of motor controlling switches 314 and 315 connected respectively to effect operation of the motor 308 in opposite directions. As shown, the switches 314 and 315 are provided with actuating coils 316 and 317 respectively. A control circuit leads from the line conductor L3 through conductor 319 to a double throw control switch 320. With switch 320 in the central position shown, the control circuit is open and the motor 308 deenergized. When the switch 320 is moved to the position in which it engages a contact 321, the control circuit is completed through the actuating coil 316 of the switch 314 to line conductor L1. This causes the switch 314 to close thereby energizing the motor 308 to drive the screw 306 in a predetermined direction. When the double throw switch 320 is moved in the other direction, it engages a contact 322 which completes the control circuit through the actuating coil 317 of the switch 315 to the line conductor L1. With the coil 317 thus energized, the switch 315 is closed to energize the motor 308 for operation in the opposite direction. Thus, when the dehydrator is operating continuously, the switch 320 is engaged alternately with the contacts 321 and 322 for operating the conveyer screw 306 alternately in opposite directions in order to fill one container after the other, the arrangement being such that while one container is being filled, a full container is being removed from the other discharge port and an empty container substituted for it.

Figures 13, 14:
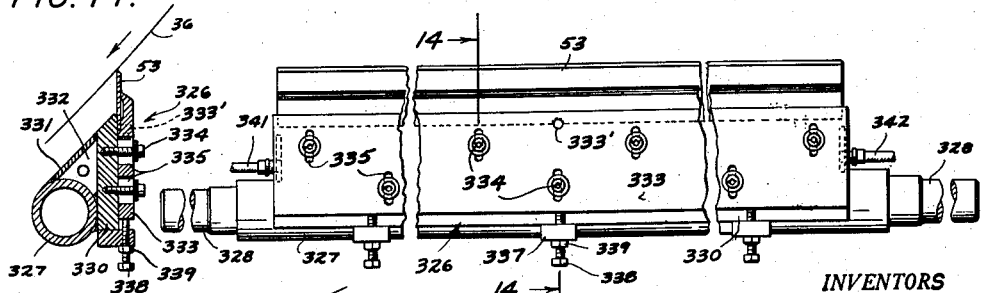
Fig. 13 is an enlarged fragmentary view in elevation of the doctor blade apparatus shown in Fig. 12 for scraping dried product from the belt and illustrating the cooling arrangement.
Fig. 14 is a view in transverse section through the doctor blade taken on the plane represented by the line 14—14 in Fig. 13.

The doctor blade 53 which scrapes the dried product from the belt 36 is preferably of relatively thin material and is held by a carrier 326 that is in the form of a rigid hollow beam disposed transversely of the housnig 21. As best shown in Figs. 13 and 14, the carrier 326 comprises primarily a hollow cylindrical shaft or tube 327 that receives at its ends journal plugs 328 which are rotatably supported in cooperating bearings on the frame 31 in a manner to provide for angular or tilting movement of the blade 53 toward, or from, the belt 36. As shown, the cylindrical shaft 327 has secured to one side thereof a vertically disposed main plate or bar 330 that constitutes the principal blade supporting member. A lighter bracing plate 331 extends at an angle from the upper edge of the plate 330 to the opposite side of the shaft 327, the arrangement being such that the shaft and the two plates define a longitudinal channel 332 of generally triangular section.

The doctor blade 53 rests in operating position in a groove formed between the main plate 330 and an adjustable supporting plate 333 disposed longitudinally thereof and extending somewhat above the plate 330, as best shown in Fig. 14. There is a locating pin 333' arranged midway of the length of the plate 333 which is anchored in the plate 333 and extends therefrom across the blade receiving groove to the face of the plate 330. The lower edge of the blade 53 is notched to engage this pin, thereby preventing the blade from moving endwise relative to its holder. This construction permits easy replacement of a blade and also lets the blade retain its flexibility and ability to conform to irregularities in the surface being scraped. The supporting plate 333 is secured to the plate 330 by means of a plurality of cap screws 334 that extend through vertically disposed slots 335 in the plate 333 and are threaded into the main plate 330. As is well understood, it is desirable for best efficiency that the doctor blade 53 should be sharpened at a pre-determined angle and that the blade itself should be presented to the belt 36 at a predetermined angle of attack. When the blade 53 becomes dull from use, it is necessary to remove and resharpen it. This results in the blade becoming narrower, and if it is replaced in the same position upon the carrier 326, it is necessary to tilt the carrier somewhat farther on its journals 328 in order to bring the blade edge into contact with the belt. This results in changing the angle at which the blade is presented to the belt and tends to reduce the material removing efficiency of the blade progressively as it is shortened successively by resharpening.

This difficulty is overcome in the present construction by reason of the arrangement whereby the blade 53 may be moved upwardly by sliding the slotted supporting plate 333 upward relative to the plate 330. As shown, the main plate 330 carries on its lower edge a plurality of lugs 337 that have threaded through them set screws 338 which bear against the lower edge of the supporting plate 333. By turning the set screws 338, the supporting plate 333 and the doctor blade 53 may be adjusted vertically until the blade 53 engages the belt 36 precisely at the pre-determined angle of attack. The screws 334 in the slots 335 may then be tightened to clamp the supporting plate 333 securely to the main plate 330 and the set screws 338 may be locked in the adjusted position by means of lock nuts 339 threaded thereon and tightened against the lugs 337.

When the dehydrating apparatus is in operation, heat is generated by friction between the doctor blade 53 and the belt 36 in scraping the dried product from the belt. This tends to increase the temperature of the entire blade supporting structure 326 and if the material being dried is thermoplastic, particles thereof flowing over it or deposited on it as spindrift become melted and stick to the blade and its supporting structure. This melted material gradually accumulates into a hard mass, portions of which break away from time to time and drop into the screw conveyer 306 with the result that the conveyer or the discharge chutes 311 may become clogged. Furthermore, it is difficult to remove this hard material from the blade holder when cleaning the machine. In order to avoid this undesirable accumulation, the blade holding structure 326 is artificially cooled to maintain it at a temperature lower than the melting point of the dried material.

Figure 15:
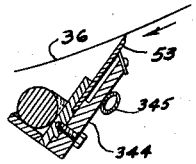
Fig. 15 is a view in section similar to Fig. 14, but showing a modified doctor blade cooling arrangement.

This is preferably effected by circulating coolant fluid through the generally triangular channel or passageway 332 formed between the plates and shaft that constitute the hollow beam structure 326. As shown in Figs. 12 and 13, coolant fluid may enter at one end of the channel 332 in the doctor blade holder 326 through a conduit 341, and is discharged from the other end thereof through a conduit 342. As an alternative, the coolant fluid may be circulated through the hollow tubular shaft 327 or through both the shaft and the passageway 332, although it has been found that the volume of coolant fluid passing through the passageway 332 is adequate to cool the entire structure 326. As another alternative, the cooling of the doctor blade and its supporting structure may be effected in the manner disclosed in the copending parent application Serial No. 364,458 and that is reproduced in Fig. 15. As there shown, a doctor blade holder or bracket 344 is provided along the outer surface of one side thereof with a conduit or pipe 345 through which coolant fluid is circulated to cool the structure. By this arrangement, the dried product may be removed from the belt in the form of discrete crystalline particles that flow over the doctor blade 53 and its supporting structure without danger of melting and adhering to them.

Apparatus of a modified type, which is generally equivalent to the cooled doctor blade, is illustrated in Figs. 8 and 9. As there shown, the instrument for removing the dried material from the belt 36 may take the form of a brush 347 preferably provided with metallic bristles 348 of stainless steel wire or the like, for example. The particular brush shown is shorter than the doctor blade 53 and is adapted for use in connection with a relatively narrow belt as illustrated. The back or holder portion of the brush is in the form of a hollow housing 349 that constitutes a cooling chamber through which coolant fluid may be circulated. As shown in Fig. 8, cooling fluid may enter one end of the hollow housing 349 through a conduit 351 and flows out of the other end through a conduit 352. By this arrangement, both the brush holder 349 and the bristles 348 are cooled to absorb heat generated by friction from movement relative to the belt 36, thereby obviating melting of the dried material.

The brush 347 may be disposed transversely of the belt or may be positioned at an angle thereto and is arranged to oscillate to improve the material removing action. To this end, the brush is supported as shown in Fig. 8 from a frame member 354 that may constitute part of the main frame 31, by means of a plurality of flexible springs or leaves 355. To effect the required oscillation, the frame member 354 carries an electromagnet 356 that may be energized intermittently through electric power conductors 357. The magnet 356 acts upon a pole piece 358 preferably of iron that is attached to the brush housing 349. The intermittent action of the magnet 356 on the pole piece 358 causes the brush 347 to oscillate through bending of the supporting springs 355.

As previously mentioned, the doctor blade 53 also is arranged to be oscillated transversely of the belt 36 to improve its action in removing the dried product therefrom through operation of the blade oscillating motor 227. As shown in Fig. 12, the oscillating motor 227 is connected to drive a transmission mechanism 360 that is of the type more fully explained in the previously mentioned copending parent application Serial No. 364,458 and that is connected to effect the oscillatory movement of the doctor blade.

The previously described supporting structure 326 for the doctor blade 53 is arranged to be moved angularly toward or from the belt 36 through rotating it upon its journal bearings 328. When it is desired to start the dehydrator it is preferable to withdraw the blade 53 from contact with the belt 36 by tilting it in direction away from the drum 34. Then, when the dried product appears on the belt, the blade is tilted toward the drum to bring it into cooperating contact with the belt 36. As shown in Fig. 12, each end of the doctor blade structure 326 is provided with a lever arm 361 that extends radially from the journal 328 and has pivotally connected to it a piston rod 362. The piston rods 362 operate in cylinders 363 that are pivotally connected at their closed ends to the frame 31 of the machine. Thus, when pressure is applied to the closed ends of the cylinders 363, the piston rods 362 are forced outwardly and the lever arms 361 are turned in direction to tilt the doctor blade 53 away from the belt 36. On the other hand, when pressure fluid is applied to the other or rod ends of the cylinders, the piston rods are drawn into the cylinders and the lever arms 361 moved in direction to engage the doctor blade with the belt.

The pressure in the cylinders 363 is preferably applied by a liquid, such as water, to which force is transmitted by air under pressure. As shown in Fig. 12, the air pressure is derived from a source represented by a conduit 366 from which it may be admitted by opening a shut-off valve 367, into a pressure regulating valve 368. From the valve 368 the air flows at a predetermined pressure through a conduit 369 to a control valve 370. With the valve 370 in the position shown, the air flows through a conduit 371 to the top of a pressure tank 372 that is partly filled with water. The water under the predetermined pressure flows from the tank 372 through a conduit 373 that divides into two branches which lead respectively to the closed ends of both the cylinders 363. With pressure thus supplied to the closed ends of the cylinders, the doctor blade 53 is tilted away from the belt 36 as previously mentioned.

When it is desired to engage the doctor blade 53 with the belt 36 for removing dried material therefrom, the position of the control valve 370 may be changed through turning it by means of a control lever 375. This results in establishing communication between the conduit 371 and an exhaust conduit 376 in order that the air pressure may be exhausted from the tank 372 thereby relieving the pressure in the closed ends of the cylinders 366. At the same time, the pressure conduit 369 is connected through the valve 370 with a conduit 378 leading to the top of another pressure tank 379 likewise partly filled with water. From the tank 379 a conduit 380, which branches into two parts, leads to the outer or rod ends of both the pressure cylinders 363. As previously mentioned, pressure in the outer ends of the cylinders causes the piston rods to be retracted and tilts the lever arms 361 in direction to turn the doctor blade 53 into cooperating engagement with the belt 36 for scraping the dried product from the belt.

The pressure with which the doctor blade engages the belt is determined by the pressure regulator 368 and may be adjusted as required by changing the setting of the regulator. Since it is preferable that the doctor blade remains out of contact with the belt at times when no material is being dried on the belt, a signal system is provided to indicate to the operator when the blade is in engagement with the belt. To this end, the conduit 380 is provided with a pressure responsive switch 381 which operates to close contacts 382 whenever pressure is applied through the conduit 380 to engage the blade with the belt. The contacts 382 when closed complete a circuit to a signal system such as a light 383 which serves to notify the operator that the blade is in engagement with the belt and operates to warn against unnecessarily running the belt with the blade in contact with it when the belt is not carrying material being dried.

From the foregoing description of the improved exemplary dehydrating apparatus and the explanation of its operation, it will be apparent that the new equipment provided by the present invention is adapted to accomplish efficient dehydration of materials from the liquid state without subjecting the material to the deleterious effects of overheating or other injurious treatment. This is accomplished through the utilization of improved mechanical structure for supporting and tensioning the drying belt together with improved apparatus for removing the dried product from the belt. Furthermore, the operation of the mechanism is coordinated by an automatically operating control system whereby malfunctioning of the belt tensioning or tracking apparatus results in stopping the machine and reducing the heating action on the material being dried.

Although specific examples of particular dehydrating apparatus illustrative of the present invention have been set forth in considerable detail by way of a full disclosure of useful embodiments of the invention, it is to be understood that other arrangements of the apparatus involving different structural features may be utilized by those familiar with the art of dehydration without departing from the spirit and scope of the invention as defined by the subjoined claims.

The features of the invention having now been fully set forth and explained, we claim as our invention:

1. In a dehydrator, a plurality of rotatably mounted spaced drums, a conveyer belt arranged to operate over said spaced drums, a driving motor operatively connected to drive said conveyer belt, a fluid pressure system operatively connected to maintain a predetermined tension in said belt, pressure responsive switches connected with said fluid pressure system and operative to open respectively upon the occurrence of insufficient pressure or upon the occurrence of excessive pressure in said system, a tracking mechanism responsive to improper tracking of said conveyer belt to either side and operatively connected to effect proper tracking of said conveyer belt in running over said drums, belt driving motor limit switches associated with said tracking mechanism and operative to open respectively upon said tracking mechanism moving to either side beyond a predetermined limit, limit switches disposed adjacent to each edge of each belt carrying drum and operative to open respectively upon said belt running off either edge of either drum beyond a predetermined limit, and a control system connected to control the operation of said belt driving motor and interconnected with said pressure responsive switches and said limit switches in a manner to stop said motor upon opening of any one of said switches, whereby said belt driving motor may be stopped upon the occurrence of insufficient or excessive pressure in said belt tensioning system, excessive movement of said tracking mechanism, or excessive misalignment of said belt relative to said drums.

2. In a dehydrator of the belt and drum type, a plurality of spaced drums, a conveyer belt running over said spaced drums to carry material being dehydrated, power operated driving apparatus connected to drive said conveyer belt, a heater disposed to heat material on said belt as it is being dehydrated, a control unit connected to control the heating effect of said heater, a doctor blade disposed to scrape dried material from said belt, power operated driving mechanism arranged to effect oscillation of said doctor blade relative to said conveyer belt to facilitate removal of dried material from said belt, a control switch operative when closed to actuate said belt driving apparatus and said doctor blade oscillating mechanism and control apparatus responsive to the position of said belt transversely of said drums and operative whenever said belt becomes misaligned beyond a predetermined limit relative to any one of said drums to open said control switch and thereby stop said power operated belt driving apparatus and said power operated blade oscillating mechanism and to actuate said heater control unit in a manner to reduce the heating effect of said material heater, whereby said dehydrator is protected from damage that might otherwise result from excessive misalignment of said belt relative to said drums should said belt continue to run and from injury that might otherwise result from continued oscillating of said doctor blade after said belt has stopped, while the material being dehydrated on said belt is protected from overheating that might otherwise occur through continued heating after said belt stops moving.

3. In a dehydrator of the belt and drum type, a supporting frame, a drum rotatably mounted on said frame, a second drum disposed in parallel spaced relationship with said first drum, a pair of rams disposed in parallel spaced relationship and arranged for sliding movement on said frame, each of said rams presenting rack teeth arranged longitudinally thereof, a pinion disposed to mesh with said rack teeth of each of said rams, a rigid shaft interconnecting said two pinions to ensure synchronized movement of said two rams, a pair of arms connected respectively to the ends of said rams, one of said arms being pivotally connected thereto to constitute a hingedly mounted extension thereof, bearings mounted on said arms to rotatably support said second drum, a conveyor belt arranged to run over said two drums, belt tracking mechanism responsive to misalignment of said belt and operative to pivot said pivoted arm for tilting said drum to correct the misalignment, and tensioning apparatus arranged to exert torque upon said rigid shaft in a manner to force said rams and said second drum in a direction away from said first drum to tension said belt for conveying material being dehydrated.

4. In a vacuum dehydrator, a housing constituting a vacuum chamber, a conveyer operating within said housing to carry material being dehydrated, a heater disposed to heat material carried on said conveyer to dehydrate it, vacuum apparatus operatively connected to maintain a low pressure atmosphere within said housing during dehydration of material therein, a pressure sensitive device connected to respond to the pressure within said chamber, and a control system operative by said pressure sensitive device only in response to pressure within said chamber below a predetermined maximum to actuate said heater at increased capacity, whereby said heater is prevented from operating at said increased capacity to avoid overheating of material on said conveyer which might otherwise occur should said heater be operated at said increased capacity when a higher pressure than said predetermined maximum obtains in said chamber.

5. In a fluid pressure actuated mechanism for operation in a position exposed to heat, a double acting cylinder for receiving pressure fluid, a piston arranged to operate within said cylinder, heat sensitive packing interposed between said piston and said cylinder to provide a fluid seal therebetween, a source of water under substantial pressure arranged to be admitted selectively to one end of said cylinder for actuating said piston with force in a working stroke, another source of water under moderate pressure arranged to be admitted selectively to the other end of said cylinder for actuating said piston in a retracting stroke, said other source of water including an expansion tank disposed above said cylinder in a position shielded from heat, and a water circulating system interconnecting said expansion tank with said low pressure end of said cylinder, the arrangement being such that water circulating through said expansion tank and said low pressure end of said cylinder operates to cool said cylinder in a manner to protect said packing from injury through overheating.

6. In a dehydrator of the drum and belt type, a plurality of rotatably mounted drums including a drum mounted in a fixed position and another drum mounted for bodily movement toward and from said fixed position drum, a conveyer belt operating over said drums, a fluid pressure actuating mechanism arranged to urge said movable drum away from said fixed drum to tension said belt, a fluid pressure source operatively connected to exert pressure upon said actuating mechanism in tensioning said belt, power actuated means arranged to drive said belt, and pressure responsive means associated with said fluid pressure actuating mechanism and operative when the pressure upon said actuating mechanism is less than a predetermined minimum or when the pressure is more than a predetermined maximum to stop said power actuated belt driving means, whereby said conveyer belt may be operated only when pressure upon said tensioning mechanism is within limits predetermined to effect proper tensioning of said belt.

7. In a dehydrator of the drum and belt type, an elongated housing, a heating drum rotatably mounted in one end of said housing, a cooling drum rotatably mounted in the other end of said housing, a material carrying belt disposed to run over said drums in a manner adapted to convey material being dried, auxiliary heating means disposed between said drums to heat material carried by said belt, a cooling jacket arranged to encircle said housing in the region between said auxiliary heating means and said cooling drum and forming a fluid passageway extending around said housing, and fluid circulating means arranged to circulate cooling fluid through said cooling jacket around said housing to cool said housing in the region thereof enclosing said cooling drum, whereby material on said belt being cooled by said cooling drum is protected from heat that might otherwise be transmitted along said housing and radiated from it to the cooled material.

8. In a fluid pressure system for actuating apparatus subjected to heat, a double acting cylinder presenting a high pressure end and a low pressure end and disposed in a position exposed to heat, a piston operating within said cylinder and connected to effect actuation of associated apparatus, a pressure fluid source selectively connectable to the high pressure end of said cylinder for exerting force on the high pressure side of said piston to actuate it, an expansion tank disposed above said cylinder in a position shielded from heat, and a conduit connecting the low pressure end of said cylinder to said expansion tank in a manner to permit liquid in said tank to flow therethrough into said cylinder at the low pressure side of said piston, whereby the liquid in the low pressure end of said cylinder serves to convey heat therefrom into said expansion tank thereby effecting cooling of said cylinder and said piston therein.

9. In a dehydrating apparatus, a pair of drums rotatably mounted in spaced parallel relationship, a conveyer belt trained around and running over said spaced drums for conveying material being dried, power actuated driving means operatively connected to drive said drums and said belt, feeding means arranged to feed material to be dried onto the outer surface of said conveyer belt, an oscillating doctor blade disposed to scrape dried material from said belt, power actuated oscillating means operatively connected to oscillate said doctor blade for improving the scraping action thereof, limit switches disposed respectively adjacent to each edge of each of said drums in position to be engaged and actuated by the extending edge of said belt in the event said belt should run off either edge of either of said drums beyond a predetermined limit, and control apparatus responsive to actuation of any one or another of said limit switches by an extending edge of said belt and operative thereupon to stop both said belt driving means and said blade oscillating means, whereby said belt will be stopped prior to excessive misalignment relative to either one of said spaced drums and said oscillating doctor blade will be stopped simultaneously to avoid wearing said belt.

10. In a fluid pressure actuated mechanism, an hydraulic cylinder for receiving pressure fluid, said cylinder being subject to a temperature substantially different from room temperature, a piston arranged to operate within said cylinder and connected to actuate associated apparatus, an expansion tank constituting a source of liquid, said expansion tank being disposed in a position thermally shielded from said cylinder to operate as a heat exchanger, a liquid circulating system interconnecting said expansion tank with one end of said hydraulic cylinder, the arrangement being such that liquid circulating in said interconnecting system through said expansion tank and said cylinder operates to exchange heat with said cylinder, and a pressure fluid source selectively connectable to said expansion tank in a manner to exert pressure upon the liquid therein for actuating said piston in said cylinder.

11. In a vacuum dehydrator, a housing constituting a vacuum chamber, a conveyor operating within said housing to carry material being dehydrated, a motor operatively connected to drive said conveyer, a heater disposed to heat material carried on said conveyer to dehydrate it, a control circuit operative to energize said conveyer driving motor selectively, vacuum apparatus operatively connected to maintain a low pressure atmosphere within said housing during dehydration of material therein, a pressure sensitive device connected to respond to the pressure within said chamber, and an interlocking control system operative by said motor control circuit and said pressure sensitive device only in response both to energization of said motor and to a pressure within said chamber below a predetermined maximum to actuate heater at increased capacity, whereby said heater is prevented from operating at said increased capacity to avoid overheating of material on said conveyer which might otherwise occur should said heater be operated at said increased capacity when said conveyer is stationary or when a higher pressure obtains in said chamber.

12. In a dehydrator, a housing constituting a dehydrating chamber, a plurality of spaced drums rotatably mounted in said housing, a conveyer belt arranged to operate over said spaced drums, a driving motor operatively connected to drive said conveyer belt, a fluid pressure system operatively connected to maintain a predetermined tension in said belt, pressure responsive switches connected with said fluid pressure system and operative to open respectively upon the occurrence of insufficient pressure or upon the occurrence of excessive pressure in said system, limit switches disposed adjacent to each edge of each belt carrying drum and operative to open respectively upon said belt running off either edge of either drum beyond a predetermined limit, and a control system connected to control the operation of said belt driving motor and interconnected with said pressure responsive switches and said limit switches in a manner to stop said motor upon opening of any one of said switches, whereby said belt driving motor may be stopped upon the occurrence of insufficient or excessive pressure in said belt tensioning system or upon the occurrence of excessive misalignment of said belt relative to said drums.

13. A dehydrator of the drum and belt type comprising a plurality of drums around which the belt passes, at least one of which is mounted for bodily movement in a direction to tension said belt, a conveyor belt operating over said drums, pressure-actuating mechanism arranged to urge said movable drum in a direction to tension said belt, power-actuated means arranged to drive said belt, and pressure-responsive means operatively connected to said pressure-actuating mechanism and operative when the pressure upon said actuating mechanism is greater than a predetermined maximum to stop said power-actuated belt driving means, whereby said conveyer belt may be operated only when pressure upon said tensioning mechanism is less than a predetermined maximum and thereby avoid breakage of the belt.

14. A dehydrator of the drum and belt type as set forth in claim 13 in which the said pressure-actuating means is fluid-pressure actuating means.

15. In a dehydrator of the belt and drum type, a rotatably mounted first drum, ram means, means for actuating said ram means, links operatively connected to said ram means, one of said links being pivoted relative to said ram means, bearings carried by the end of said links, a second drum mounted in said bearings, said ram means and links being positioned upon actuation of said ram means to cause said second drum to be moved in a direction away from the first drum, whereby said second drum may be moved to apply desired tension to the said belt, and control means arranged to pivot said pivotally mounted link and thereby tilt said second drum in a manner to effect training of said belt in running over said drums by pivoting the drum in a plane at right angles to the plane of movement of the drum upon actuation of said ram means.

16. In a belt dryer for drying material from the liquid state, a rigid frame, a pair of drums rotatably mounted in said frame, an endless belt trained around said drums, means for moving one of said drums relative to the other in a direction to tension said belt, and means for moving one end of one of said drums in a direction transverse to the direction of the belt tensioning movement of said one drum to tilt said drum to effect tracking alignment of said belt in running over said drums, the arrangement being such that the tensioning of said belt and the tilting thereof may be accomplished independently.

17. A fluid pressure actuated mechanism as set forth in claim 10 including a heat sensitive packing material interposed between said piston and said cylinder to provide a fluid seal therebetween.

18. In a belt type of dryer for drying material from the liquid state, a rigid frame, a first drum rotatably mounted in said frame, rams slidably mounted in said frame in spaced relationship for sliding movement generally radially of said first drum, links connected respectively to and constituting extensions of said rams, means pivotally connecting one of said links to one of said rams, bearings mounted on the distal ends of said links, a second drum rotatably mounted in said bearings and between said rams and links in cooperating parallel relationship with said first drum, a material carrying belt trained around and running over said cooperating drums, pressure means to urge said slidably mounted rams outwardly from said first drum in said frame whereby said second drum may be moved to apply desired tension to said belt, and automatically operating control means arranged to pivot said pivotally mounted link and thereby tilt said second drum in a manner to effect training of said belt in running over said drums by pivoting the drum in a plane at right angles to the plane of the rams and drum axis.

19. In a dehydrating apparatus, a pair of drums rotatably mounted in spaced parallel relationship, a conveyor belt trained around and running over said drums for conveying material being dried, power actuated driving means operatively connected to drive said drums and said belt, feeding means arranged to feed material to be dried onto the outer surface of said conveyor belt, an oscillating doctor blade disposed to scrape dried material from said belt, power actuated oscillating means operatively connected to oscillate said doctor blade for improving the scraping action thereof, a pair of limit switches arranged to respond to misalignment of said belt, switch operators disposed in position to be respectively engaged and actuated by each edge of said belt in the event said belt should run off either edge of said drums and operatively connected to respectively actuate said limit switches, and control apparatus responsive to actuation of the one or the other of said limit switches by reason of misalignment of said belt and operative thereupon to stop both said belt driving means and said blade oscillating means, whereby said belt will be stopped prior to excessive misalignment relative to said drums and said oscillating doctor blade will be stopped simultaneously to avoid wearing said belt.

20. In a dehydrator of the belt and drum type, a plurality of spaced drums, a conveyor belt running over said spaced drums to carry material being dehydrated, power operated driving apparatus connected to drive said conveyor belt, a doctor blade disposed to scrape dried material from said belt, power operated driving apparatus arranged to effect oscillation of said doctor blade relative to said conveyor belt to facilitate removal of dried material from said belt, and control apparatus connected to control said power operated belt-driving and blade-oscillating apparatus and arranged to be responsive to the position of said belt transversely of said drums in a manner operative whenever said belt becomes misaligned beyond a predetermined limit relative to said drums to stop said power operated belt driving apparatus and said power operated blade oscillating apparatus, whereby said dehydrator is protected from damage that might otherwise result from continued excessive misalignment of said belt relative to said drums by stopping said belt and from injury to said belt that might otherwise result from continued oscillating of said doctor blade after said belt has stopped moving.

21. In a dehydrating apparatus, a pair of drums rotatably mounted in spaced, parallel relationship, a conveyor belt trained around and running over said drums for conveying the material being dried, power-actuated driving means operatively connected to drive said drums and said belt, feeding means arranged to feed material to be dried onto the outer surface of said conveyor belt, an oscillating doctor blade disposed to scrape dried material from said belt, power-actuated oscillating means operatively connected to oscillate said doctor blade for improving the scraping action thereof, and means controlling said power-actuated driving means and said power-actuated oscillating means to stop the driving action of said driving means, said belt and said oscillating means, said doctor blade being stopped simultaneously with said belt on actuation of said control means to avoid wearing said belt.

22. In a dehydrator of the belt type for drying material from the liquid state, a rigid frame, a first drum rotatably mounted in said frame, a pair of spaced drum carrying bearings movably mounted in said frame, a second drum rotatably mounted between and in said spaced movably mounted bearings in cooperating parallel relationship with said first drum, a material carrying belt trained around and running over said cooperating drums, means to move said movable bearings generally radially outwardly and inwardly relative to said first drum to apply desired tension to said belt, and automatically operating belt tracking control apparatus arranged to respond to misalignment of said belt in running over said drums and operative thereupon to move one of said movable bearings in a direction substantially transverse to the direction of belt tensioning movement of said bearings to tilt said second drum to effect tracking alignment of said belt in running over said drums, the arrangement being such that since the respective adjusting movements are effected in directions substantially transverse to each other, the tensioning adjustment of said belt may be obtained independently of the tracking alignment and the tracking alignment may be obtained independently of the tensioning adjustment of said belt.

23. In a belt dryer for drying material from the liquid state, a rigid frame, a first drum rotatably mounted in said frame, bearing carrying brackets mounted in said frame in spaced relationship and extending outwardly from said frame in a generally radial direction relative to said first drum, means pivotally mounting one of said brackets to said frame, bearings slidably mounted in said brackets for movement toward or from said first drum, a second drum rotatably mounted in said bearings between said brackets and in cooperating parallel relationship with said first drum, a material carrying belt trained around and running over said cooperating drums, fastening means arranged to secure said slidably mounted bearings in adjusted position in said brackets whereby said second drum may be positioned to apply desired tension to said belt, and automatically operating control means arranged to pivot said pivotally mounted bracket to effect tracking of said belt in running over said drums.

References Cited in the file of this patent

UNITED STATES PATENTS

| | | |
|---|---|---|
| 832,361 | Blevins | Oct. 2, 1906 |
| 987,394 | Passburg | Mar. 21, 1911 |
| 1,353,980 | Yahn | Sept. 28, 1920 |
| 1,504,991 | Stern | Aug. 12, 1924 |
| 1,507,238 | Kocourek | Sept. 2, 1924 |
| 1,514,158 | Holt | Nov. 4, 1924 |

(Other references on following page)

UNITED STATES PATENTS

| Number | Name | Date |
|---|---|---|
| 1,652,518 | Cumfer | Dec. 13, 1927 |
| 1,933,485 | Rund et al. | Oct. 31, 1933 |
| 2,075,111 | Gulliksen et al. | Mar. 30, 1937 |
| 2,131,666 | McDougall | Sept. 27, 1938 |
| 2,294,996 | Mercier | Sept. 8, 1942 |
| 2,576,496 | Ziegler | Nov. 27, 1951 |
| 2,600,273 | Seifried | June 10, 1952 |
| 2,674,366 | Kindseth et al. | Apr. 6, 1954 |
| 2,695,700 | Lindgren et al. | Nov. 30, 1954 |
| 2,705,137 | Haltmeier | Mar. 29, 1955 |
| 2,709,588 | Staege | May 31, 1955 |
| 2,728,387 | Smith | Dec. 27, 1955 |

OTHER REFERENCES

Research Reports on Quartermaster Contract Projects, Massachusetts Institute of Technology, June 1, 1946, Figs. S–10 and S–11.